(12) United States Patent
Deguchi et al.

(10) Patent No.: US 11,609,768 B2
(45) Date of Patent: Mar. 21, 2023

(54) APPLICATION MANAGEMENT APPARATUS, IN-VEHICLE SYSTEM, AND APPLICATION MANAGEMENT METHOD

(71) Applicant: MITSUBISHI ELECTRIC CORPORATION, Tokyo (JP)

(72) Inventors: Masahiro Deguchi, Tokyo (JP); Takehisa Mizuguchi, Tokyo (JP); Shinichi Ochiai, Tokyo (JP); Hiroki Konaka, Tokyo (JP); Kiyotaka Morita, Tokyo (JP); Junya Ujiie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 357 days.

(21) Appl. No.: 16/937,799

(22) Filed: Jul. 24, 2020

(65) Prior Publication Data

US 2020/0356382 A1    Nov. 12, 2020

Related U.S. Application Data

(63) Continuation of application No. PCT/JP2018/010645, filed on Mar. 16, 2018.

(51) Int. Cl.
  *G06F 9/44*  (2018.01)
  *G06F 9/445* (2018.01)
  *B60R 16/023* (2006.01)

(52) U.S. Cl.
  CPC ...... *G06F 9/44505* (2013.01); *B60R 16/0231* (2013.01)

(58) Field of Classification Search
  CPC .................. G06F 1/32; G06F 1/12; G06F 9/44
  See application file for complete search history.

(56) References Cited

U.S. PATENT DOCUMENTS

| 6,148,253 A | 11/2000 | Taguchi et al. |
| 2008/0270933 A1* | 10/2008 | Straw ............... G06F 3/0481 |
| | | 715/781 |

(Continued)

FOREIGN PATENT DOCUMENTS

| JP | 11-334483 A | 12/1999 |
| JP | 2014-179103 A | 9/2014 |
| JP | 2014-233998 A | 12/2014 |

OTHER PUBLICATIONS

International Search Report, issued in PCT/JP2018/010645, PCT/ISA/210, dated Jun. 12, 2018.

*Primary Examiner* — Keshab R Pandey
(74) *Attorney, Agent, or Firm* — Birch, Stewart, Kolasch & Birch, LLP

(57) ABSTRACT

An application management apparatus (103) acquires a use application program from a storage region when either one of an information processing apparatus (1)(101) and an information processing apparatus (2)(102) starts a startup process, the use application program being an application program to be used by a user of a start-up information processing apparatus being the information processing apparatus which starts the startup process. The application management apparatus (103) transmits the acquired use application program to the start-up information processing apparatus. Each of the information processing apparatus (1)(101) and the information processing apparatus (2)(102) receives the us application program which is transmitted from the application management apparatus (103), and start the received use application program and complete the startup process.

11 Claims, 17 Drawing Sheets

(56) References Cited

U.S. PATENT DOCUMENTS

| | | |
|---|---|---|
| 2014/0280051 A1 | 9/2014 | Djugash |
| 2014/0358325 A1 | 12/2014 | Morita et al. |
| 2016/0224211 A1* | 8/2016 | Xu .................. G06F 3/0482 |
| 2017/0206101 A1* | 7/2017 | Raman ............ G06F 9/44521 |

* cited by examiner

| USER | LAST-USE APPLICATION | USE APPLICATION | LAST-USE DATA | USE DATA |
|---|---|---|---|---|
| A | MUSIC PLAYBACK (MP3) | THIS VIEWER | POP SONG. MP3 | MAGAZINE A |
| B | VIDEO PLAYBACK (H.264) | THIS VIEWER, GAME G | ANIME, MPEG | CARTOON Z |
| C | GAME H | | | |
| D | NAVIGATION | VIDEO PLAYBACK (MPEG2) | | MOVIE, MPEG |
| ... | ... | ... | ... | ... |

APPLICATION MANAGEMENT APPARATUS, IN-VEHICLE SYSTEM, AND APPLICATION MANAGEMENT METHOD

CROSS REFERENCE TO RELATED APPLICATIONS

This application is a Continuation of PCT International Application No. PCT/JP2018/010645 filed on Mar. 16, 2018, which is hereby expressly incorporated by reference into the present application.

TECHNICAL FIELD

The present invention relates to management of an application program (hereinafter also simply referred to as an application) in a vehicle.

BACKGROUND ART

In a conventional in-vehicle system, an information processing apparatus for a front seat and an information processing apparatus for a backseat are separately prepared. The conventional in-vehicle system improves resource efficiency by deleting an application not to be used in each information processing apparatus (for example, Patent Literature 1).

There is also available a technique for improving resource efficiency by selecting an application to be used for each time of usage or each usage scene (for example, Patent Literature 2).

CITATION LIST

Patent Literature

Patent Literature 1: JP 11-334483
Patent Literature 2: JP 2014-233998

SUMMARY OF INVENTION

Technical Problem

Assume that a plurality of users use a vehicle in which a plurality of information processing apparatuses are mounted. For example, assume a case where respective information processing apparatuses are deployed for a front seat and a backseat. Generally, combinations of users and the seats (the information processing apparatuses) are not fixed. That is, which seat each user sits on and which information processing apparatus the user uses are not designated in advance. Additionally, applications to be used generally vary by user. For this reason, in order for a user to use a desired application regardless of which information processing apparatus the user uses, it is necessary to store, in advance, all applications to be used by all users in each information processing apparatus.

The storage of all the applications in each information processing apparatus, however, leads to duplicate resource consumption in a whole in-vehicle system. Further, startup of the information processing apparatus requires a long time.

The present invention mainly aims at solving the above-described problems. That is, the present invention has its major object to realize resource efficiency and speeding up of startup of an information processing apparatus.

Solution to Problem

An application management apparatus according to the present invention to be mounted on a vehicle in which a plurality of information processing apparatuses are mounted and manages a storage region in which a plurality of application programs are stored, the application management apparatus includes:

an application acquisition unit to acquire a use application program from the storage region when any one of the plurality of information processing apparatuses starts a startup process, the use application program being an application program to be used by a user of a start-up information processing apparatus being the information processing apparatus which starts the startup process; and a transmission unit to transmit the use application program acquired by the application acquisition unit to the start-up information processing apparatus.

Advantageous Effects of Invention

In the present invention, only an application program to be used by a user is transmitted to an information processing apparatus when the information processing apparatus starts a startup process. Thus, according to the present invention, it is unnecessary to store all application programs in an information processing apparatus in advance and it is possible to realize resource efficiency and speeding up of startup of an information processing apparatus.

DESCRIPTION OF EMBODIMENTS

Figure 1:
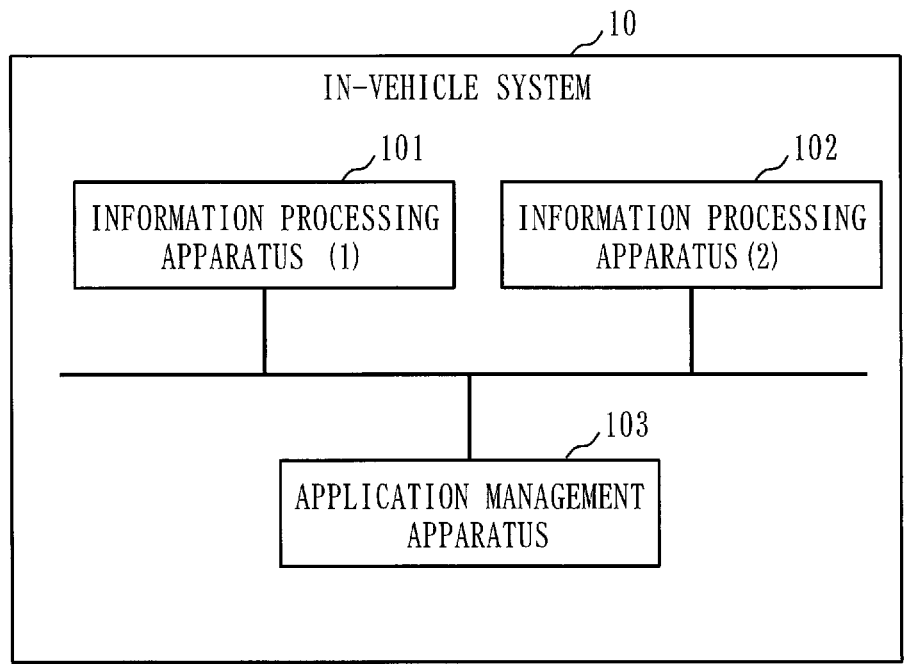
FIG. 1 is a diagram illustrating an example of a configuration of an in-vehicle system according to Embodiment 1.

Embodiments of the present invention will be described below with reference to the drawings. Elements to which same reference characters are assigned, in the following description of the embodiments and the drawings denote same elements or corresponding elements.

Embodiment 1

Description of Configuration

FIG. 1 illustrates an example of a configuration of an in-vehicle system 10 according to the present embodiment.

The in-vehicle system 10 is mounted on a vehicle (not illustrated in FIG. 1).

As illustrated in FIG. 1, the in-vehicle system 10 includes two information processing apparatuses which are an information processing apparatus (1) 101 and an information processing apparatus (2) 102, and an application management apparatus 103.

For example, the information processing apparatus (1) 101 is arranged for a front seat of the vehicle while the information processing apparatus (2) 102 is arranged for a backseat.

Although two information processing apparatuses are illustrated in FIG. 1, the number of information processing apparatuses included in the in-vehicle system 10 may be equal to or more than three.

Note that the information processing apparatus (1) 101 and the information processing apparatus (2) 102 will hereinafter be collectively referred to as information processing apparatuses 100 if there is no need for distinction between the two.

The application management apparatus 103 includes a storage region in which a plurality of application programs are stored and manages the storage region.

Figure 2:
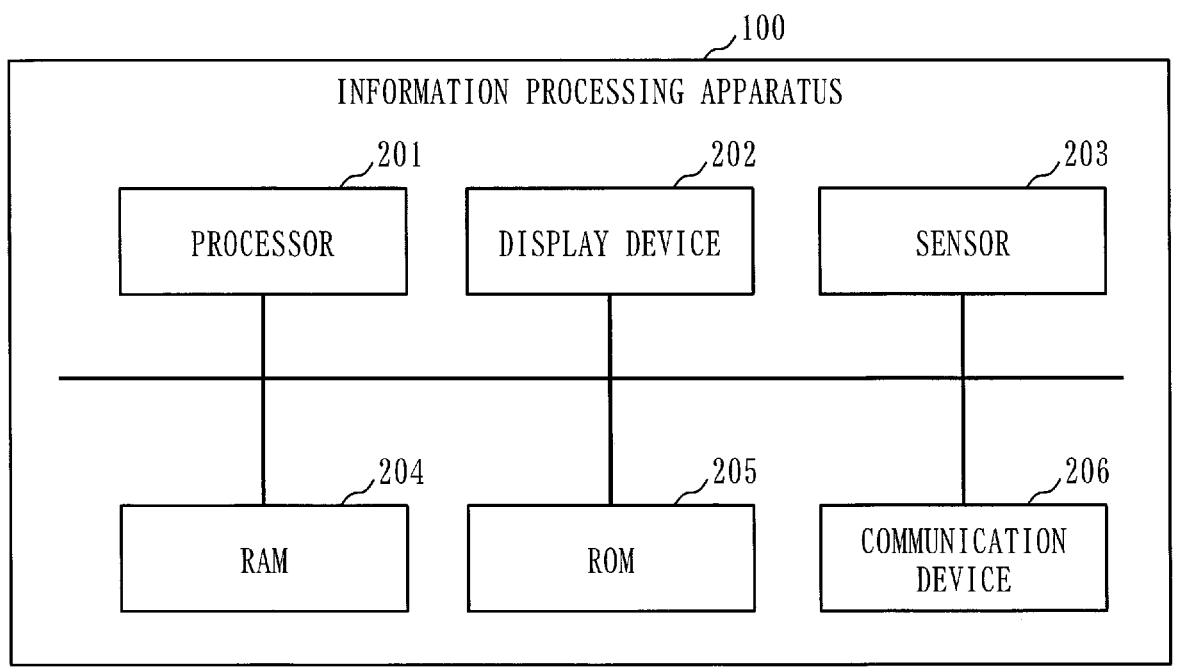
FIG. 2 is a diagram illustrating an example of a hardware configuration of an information processing apparatus according to Embodiment 1.

FIG. 2 illustrates an example of a hardware configuration of the information processing apparatus 100 according to the present embodiment.

The information processing apparatus 100 is a computer.

The information processing apparatus 100 includes, as hardware, a processor 201, a display device 202, a sensor 203, a RAM (Random Access Memory) 204, a ROM (Read Only Memory) 205, and a communication device 206.

The processor 201 is, for example, a CPU (Central Processing Unit). The processor 201 executes software, such as a first OS (Operating System) 401 and a service manager 402 to be described later with reference to FIG. 4.

The ROM 205 is a rewritable nonvolatile memory. The ROM 205 includes a flash ROM, an HDD (Hard Disk Drive) and the like. The software, such as the first OS 401, the service manager 402 and the like, is stored in the ROM 205. An application table (to be described later) is also stored in the ROM 205. An application provided from the application management apparatus 103 is further stored in the ROM 205.

The software, such as the first OS 401, the service manager 402 and the like, is loaded into the RAM 204. An application provided from the application management apparatus 103 is also loaded into the RAM 204.

The display device 202 displays screen information generated by an application.

The sensor 203 is, for example, a human detecting sensor and is used to recognize a user of the information processing apparatus 100.

The communication device 206 is used for communication with the different information processing apparatus 100 or the application management apparatus 103.

Figure 3:
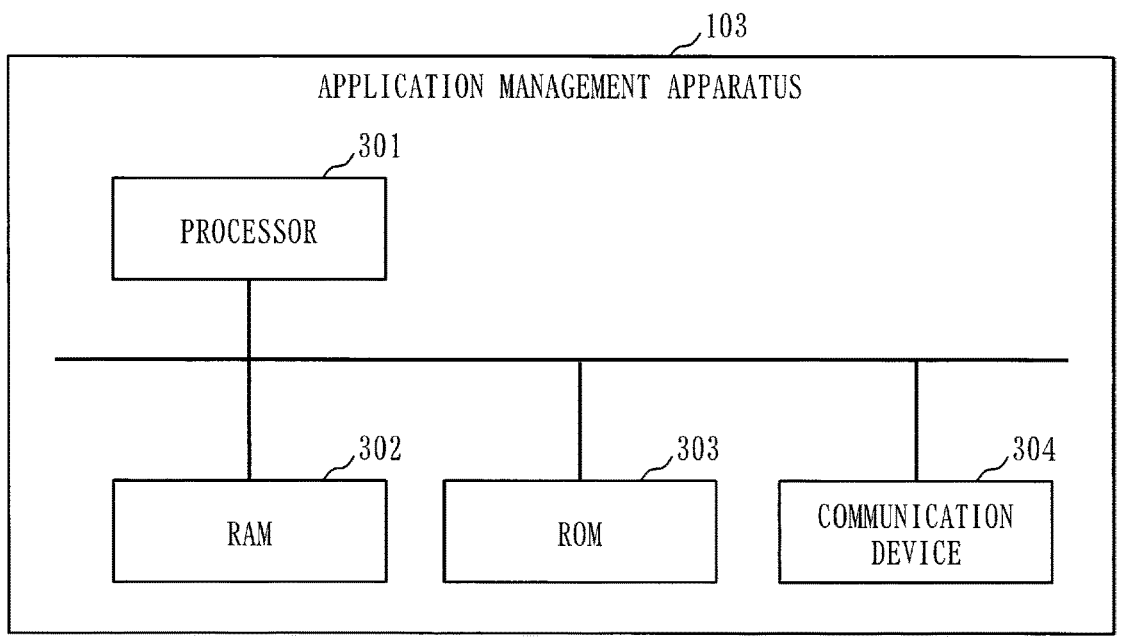
FIG. 3 is a diagram illustrating an example of a hardware configuration of an application management apparatus according to Embodiment 1.

FIG. 3 illustrates an example of a hardware configuration of the application management apparatus 103 according to the present embodiment.

The application management apparatus 103 is a computer.

The application management apparatus 103 includes a processor 301, a RAM 302, a ROM 303, and a communication device 304.

The processor 301 is, for example, a CPU. The processor 301 executes an OS 501 and an overall application manager 502 to be described later with reference to FIG. 5.

The ROM 303 is a rewritable nonvolatile memory. The ROM 303 includes a flash ROM, an HDD and the like. The OS 501 and the overall application manager 502 are stored in the ROM 303. A plurality of applications to be provided to the information processing apparatus 100 are also stored in the ROM 303. A plurality of pieces of data to be used by the plurality of applications are further stored in the ROM 303. That is, the ROM 303 is a storage region which stores the plurality of applications and the plurality of pieces of data.

The OS 501 and the overall application manager 502 are loaded into the RAM 302.

The communication device 304 is used for communication with the information processing apparatus 100.

In the present embodiment, the plurality of applications are stored in the ROM 303 in the application management apparatus 103. Alternatively, a configuration may be employed in which the plurality of applications are stored in a storage device outside the application management apparatus 103. Even in the configuration, the application management apparatus 103 can manage the external storage device and acquire the plurality of applications from the external storage device.

Figure 4:
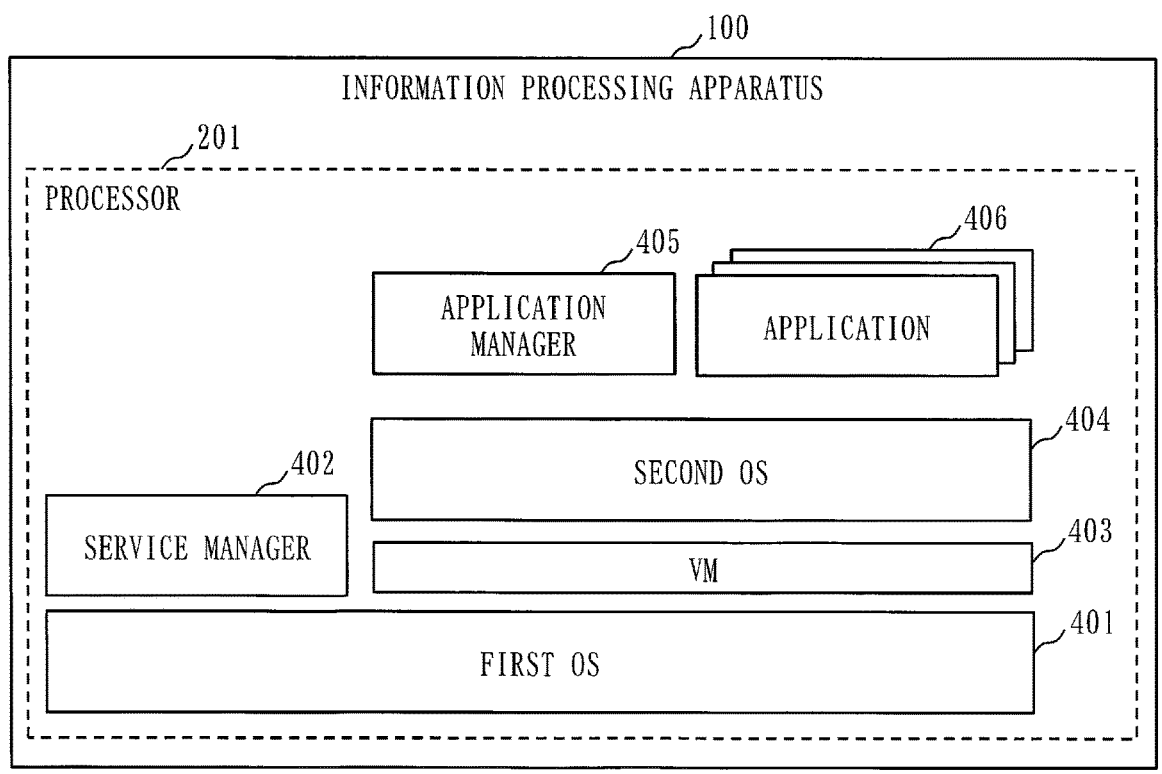
FIG. 4 is a diagram illustrating an example of a functional configuration of the information processing apparatus according to Embodiment 1.

FIG. 4 illustrates an example of a functional configuration of the information processing apparatus 100.

The information processing apparatus 100 includes the first OS 401, the service manager 402, a VM (Virtual Machine) 403, a second OS 404, an application manager 405, and applications 406 which are software.

The service manager 402, the VM 403, and the second OS 404 operate on the first OS 401.

The application manager 405 and the applications 406 operate on the second OS 404.

Pieces of software illustrated in FIG. 4 are the same as existing ones, and a detailed description thereof will be omitted. Note that the applications 406 are received from the application management apparatus 103 at the time of startup of the information processing apparatus 100 and that the information processing apparatus 100 does not always hold the applications 406.

As described earlier, the pieces of software illustrated in FIG. 4 are executed by the processor 201. FIG. 4 schematically represents a state in which the pieces of software are being executed by the processor 201.

Figures 5, 6:
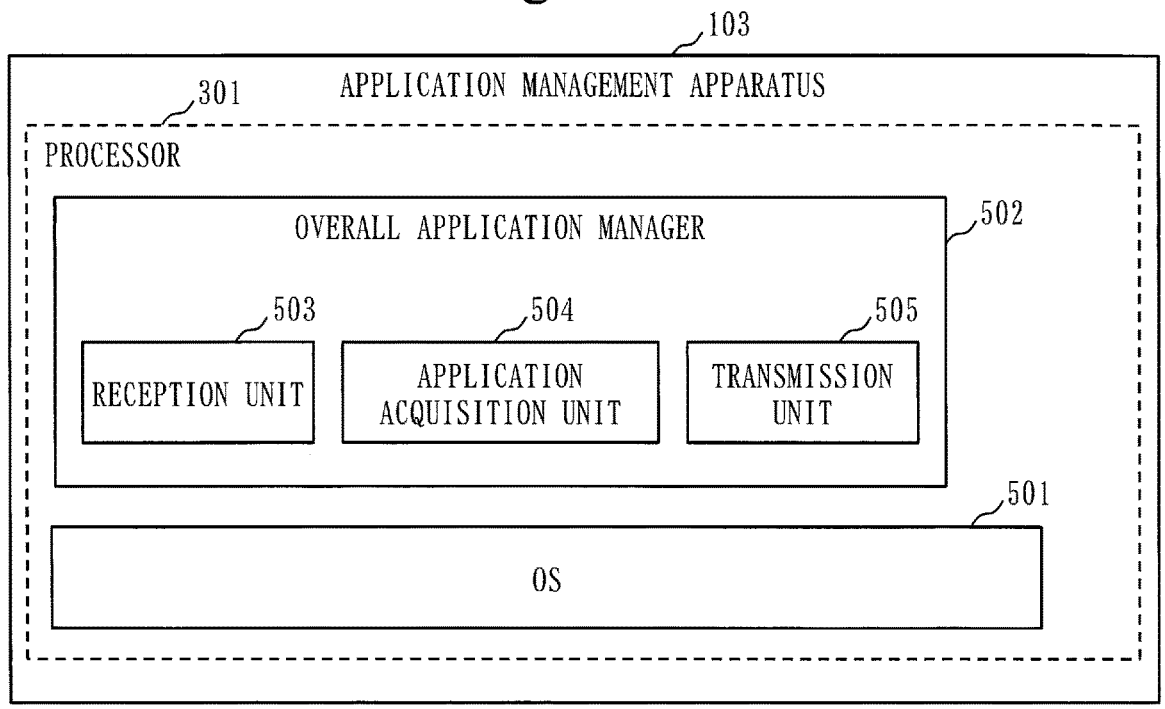
FIG. 5 is a diagram illustrating an example of a functional configuration of the application management apparatus according to Embodiment 1.
FIG. 6 is a diagram illustrating an example of an application table according to Embodiment 1.

FIG. 5 illustrates an example of a functional configuration of the application management apparatus 103.

The application management apparatus 103 includes the OS 501 and the overall application manager 502 that are pieces of software.

The overall application manager 502 manages the plurality of applications held by the application management apparatus 103.

The overall application manager 502 is composed of a reception unit 503, an application acquisition unit 504, and a transmission unit 505.

When any information processing apparatus 100 starts a startup process, the reception unit 503 receives via the communication device 304, use application notification information from the information processing apparatus 100 which starts the startup process.

The information processing apparatus 100 which starts the startup process will also be referred to as a start-up information processing apparatus.

The use application notification information indicates a use application program (hereinafter referred to as a use application), a last-use application program (hereinafter referred to as a last-use application), use data, and last-use data for a user which uses the start-up information processing apparatus.

The use application is an application program to be used by the user of the start-up information processing apparatus.

The last-use application is an application program last used by the user of the start-up information processing apparatus.

The use data is data to be used by the use application.

The last-use data is data to be used by the last-use application.

The application acquisition unit 504 acquires the use application, the last-use application, the use data, and the last-use data, notified of by the use application notification information, from the ROM 303.

A process to be performed by the application acquisition unit 504 corresponds to an application acquisition process.

The transmission unit 505 transmits the last-use application, the use application, the last-use data, and the use data acquired by the application acquisition unit 504 to the start-up information processing apparatus.

More specifically, the transmission unit 505 more preferentially transmits the last-use application and the last-use data to the start-up information processing apparatus than the use application other than the last-use application and the use data.

A process to be performed by the transmission unit 505 corresponds to a transmission process.

As described earlier, the OS 501 and the overall application manager 502 illustrated in FIG. 5 are executed by the processor 301. FIG. 5 schematically represents a state in which the OS 501 and the overall application manager 502 are being executed by the processor 301.

Note that an operation to be performed by the application management apparatus 103 corresponds to an application management method and an application management program.

At least any of information, data, a signal value, and a variable value obtained through execution of the software illustrated in FIG. 4 and the software illustrated in FIG. 5 is stored in at least any of a RAM, a ROM, and a register and a cache memory in a processor.

The software illustrated in FIG. 4 and the software illustrated in FIG. 5 may be stored in a portable storage medium, such as a magnetic disk, a flexible disk, an optical disc, a compact disc, a Blu-ray (registered trademark) disc, or a DVD.

Each of the software illustrated in FIG. 4 and the software illustrated in FIG. 5 can also be treated as a "circuit", a "step", a "procedure", or a "process".

Some of the software illustrated in FIG. 4 and the software illustrated in FIG. 5 may each be implemented by a processing circuit. The processing circuit is, for example, a logic IC (Integrated Circuit), a GA (Gate Array), an ASIC (Application Specific Integrated Circuit), or an FPGA (Field-Programmable Gate Array).

Note that the superordinate concept of processors and processing circuits is referred to as "processing circuitry" in the present specification.

That is, a processor and a processing circuit are concrete examples of "processing circuitry".

FIG. 6 illustrates an example of an application table 600.

As illustrated in FIG. 6, the application table 600 includes a user 601, a last-use application 602, a use application 603, last-use data 604, and use data 605.

Identifiers of all users that use the vehicle, that is, all users recognized in the in-vehicle system 10 are illustrated in a user 601 column.

An identifier of a last-use application of each user is illustrated in a last-use application 602 column. The last-use application is, for example, an application last used by the user before turnoff of an engine of the vehicle. The last-use application may be an application last used by the user in the information processing apparatus 100 used before the seat change in a case where the user changes seats and starts using the different information processing apparatus 100.

An identifier of a use application of each user is illustrated in a use application 603 column. The use application is an application frequently used by the user.

An identifier of last-use data of each user is illustrated in a last-use data 604 column. The last-use data is data used by the last-use application at the time of execution of the last-use application.

An identifier of use data of each user is illustrated in a use data 605 column. Data used at the time of execution of the used application is illustrated.

Description of Operation

Figure 7:
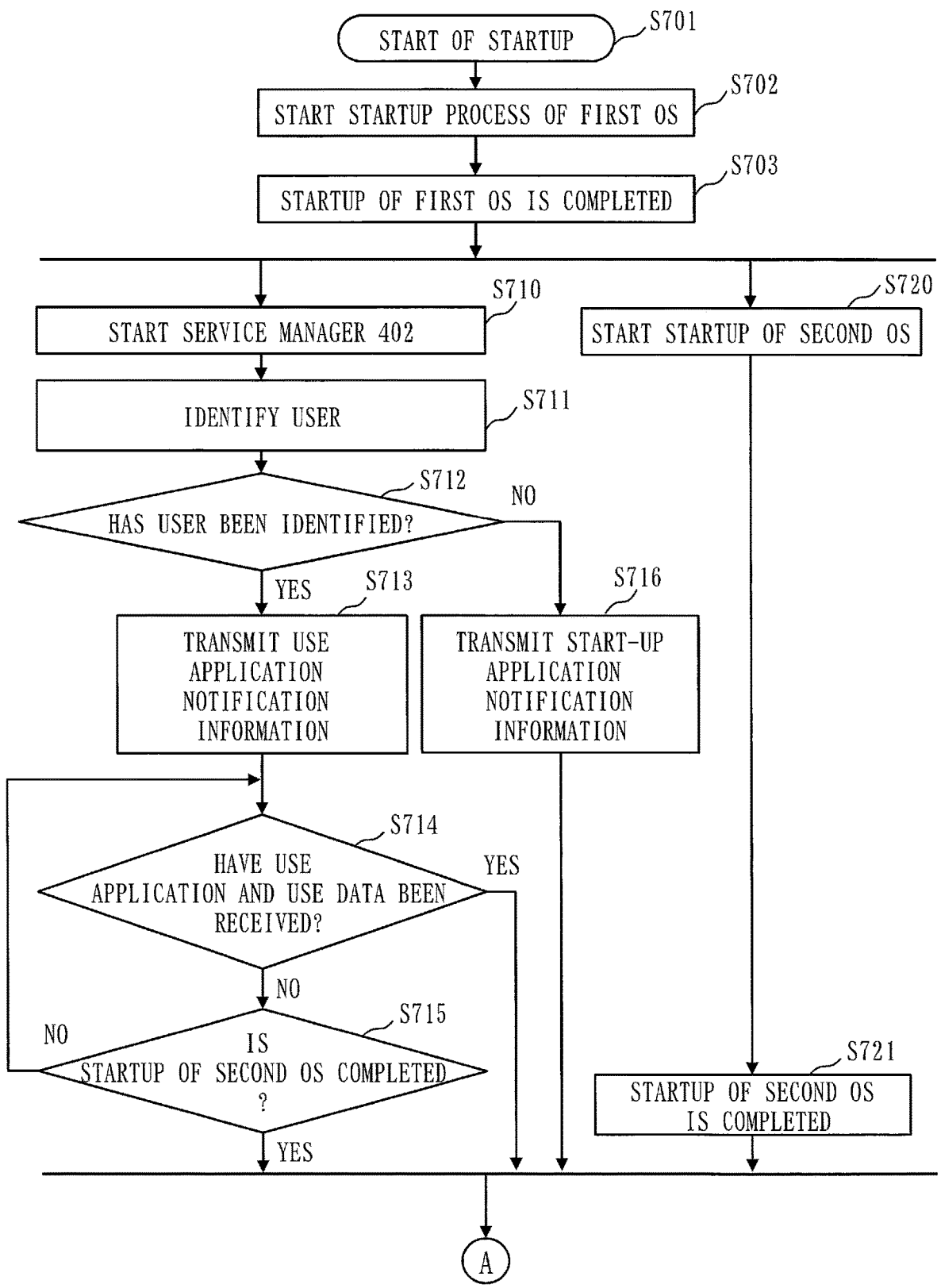
FIG. 7 is a flowchart illustrating an example of operation at the time of startup of the information processing apparatus according to Embodiment 1.
Figure 8:
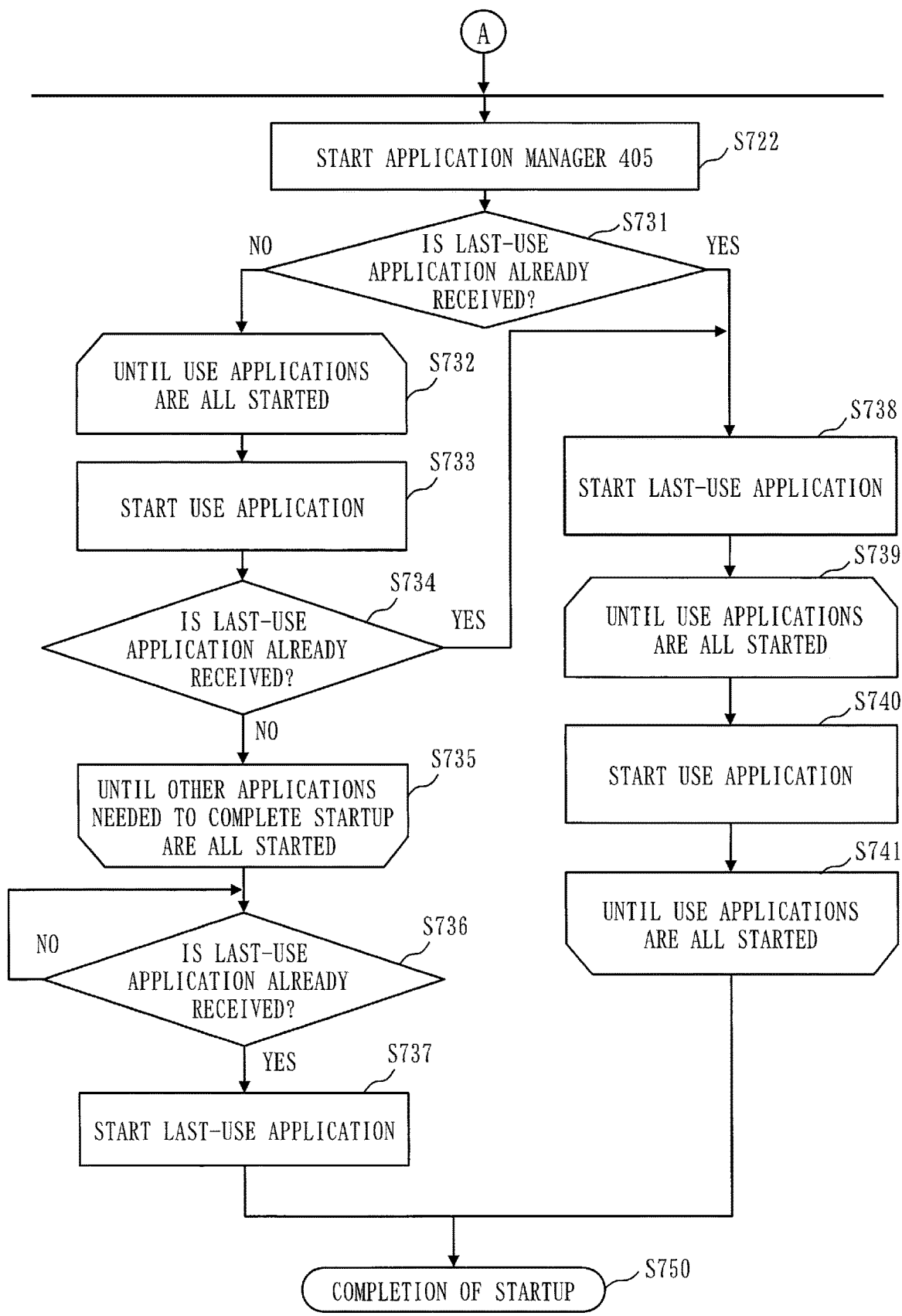
FIG. 8 is a flowchart illustrating the example of the operation at the time of startup of the information processing apparatus according to Embodiment 1.

FIGS. 7 and 8 are flowcharts illustrating an example of operation at the time of startup of the information processing apparatus 100.

Figure 9:
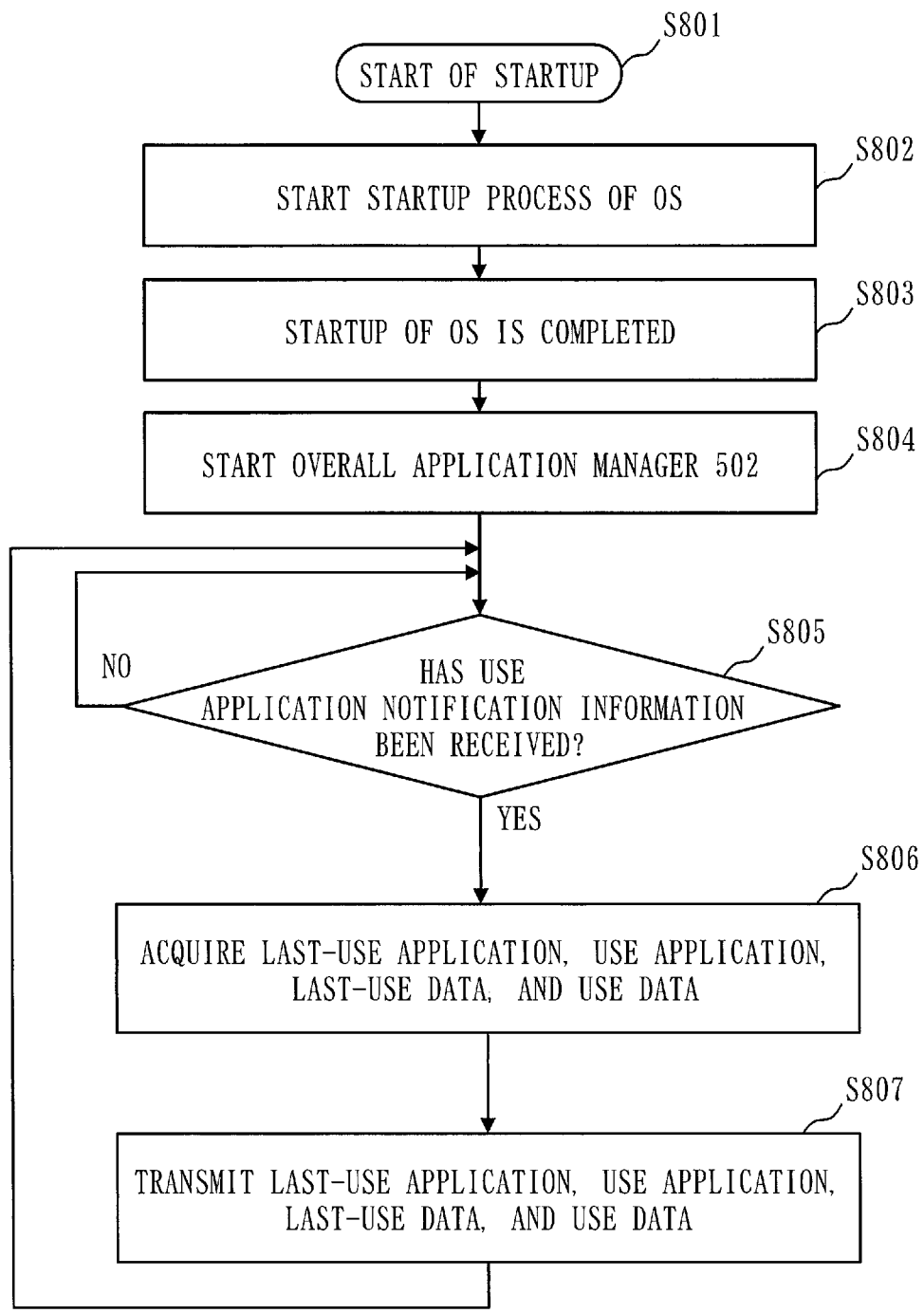
FIG. 9 is a flowchart illustrating an example of operation at the time of startup of the application management apparatus according to Embodiment 1.

FIG. 9 is a flowchart illustrating an example of operation at the time of startup of the application management apparatus 103.

Figure 10:
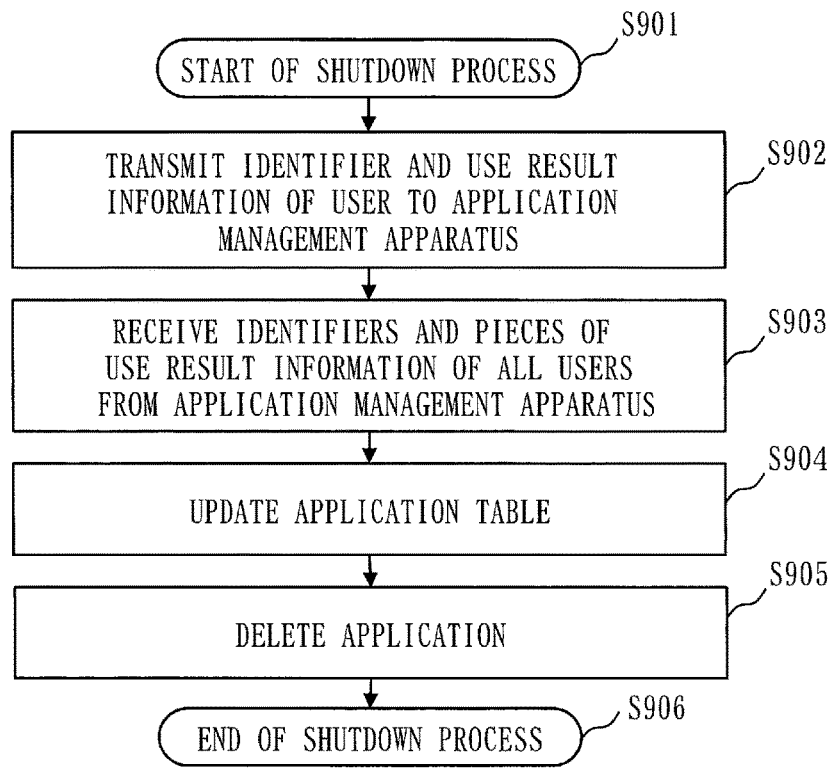
FIG. 10 is a flowchart illustrating an example of operation at the time of shutdown of the information processing apparatus according to Embodiment 1.

FIG. 10 is a flowchart illustrating an example of operation at the time of shutdown of the information processing apparatus 100.

Figure 11:
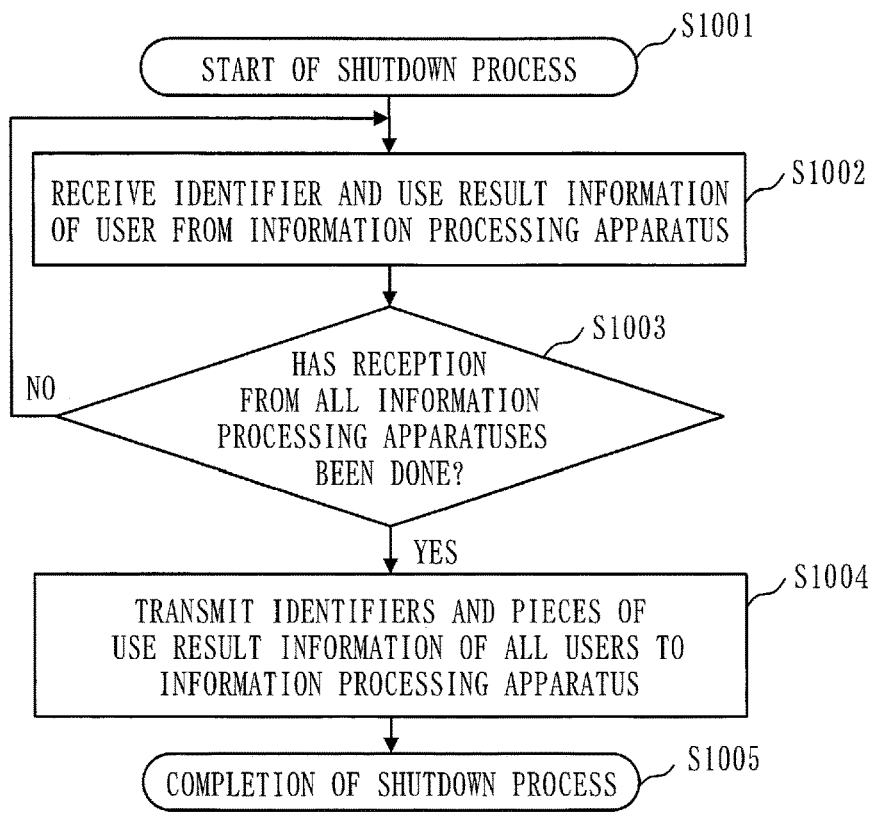
FIG. 11 is a flowchart illustrating an example of operation at the time of shutdown of the application management apparatus according to Embodiment 1.

FIG. 11 is a flowchart illustrating an example of operation at the time of shutdown of the application management apparatus 103.

The operations at the time of startup will be described first with reference to FIGS. 7, 8, and 9.

At the time of startup of the in-vehicle system 10, the information processing apparatus 100 starts a startup process (step S701), and the application management apparatus 103 starts a startup process (step S801).

Next, in the information processing apparatus 100, a startup process of the first OS 401 is started in step S702.

When startup of the first OS 401 is completed in step S703, the service manager 402 that operates on the first OS 401 is started up in step S710.

In parallel, the second OS 404 is started up in step S720. The second OS 404 completes the startup in step S721.

When the service manager 402 is started up, the service manager 402 identifies a user of the information processing apparatus 100 using the sensor 203 in step S711.

The service manager 402 identifies the user through, for example, face authentication, iris authentication, or fingerprint authentication.

If the user is identified (YES in step S712), the service manager 402 transmits use application notification information to the application management apparatus 103 via the communication device 206 in step S713.

More specifically, the service manager 402 refers to the application table 600 and identifies a last-use application, a use application, last-use data, and use data corresponding to the user identified in step S712. The service manager 402 then generates the use application notification information notifying of the identified last-use application, use application, last-use data, and use data and transmits the generated use application notification information to the application management apparatus 103 via the communication device 206.

If use applications and use data including the last-use application and the last-use data of the user are all received (YES in step S714) or if the startup of the second OS 404 is completed (YES in step S715), the service manager 402 ends processing.

Even if the use applications and the use data are not all received, the service manager 402 can end processing when the startup of the second OS 404 is completed.

If the user is not identified in step S712, the service manager 402 transmits start-up application notification information to the application management apparatus 103 via the communication device 206. Since the user is not identified, the service manager 402 cannot identify a last-use application, a use application, and the like. For this reason, the service manager 402 determines, as a start-up application, an application to be first started up in the information processing apparatus 100 and transmits the start-up application notification information notifying of the determined start-up application to the application management apparatus 103.

The service manager 402 may determine the start-up application in any manner.

Note that an example will be described below in which the user is identified in step S712 and the use application notification information is transmitted in step S713.

An example of operation in a case where the start-up application notification information is transmitted in step S716 can be obtained by replacing the "last-use application" with the "start-up application" and replacing the "use application notification information" with the "start-up application notification information" in the description below.

Next, in step S722, the application manager 405 is started up.

The application manager 405 determines in step S731 whether the last-use application is already received.

If the last-use application is already received (YES in step S731), the application manager 405 starts up the last-use application in step S738.

After that, in steps S739 to S741, each time a use application other than the last-use application is received, the application manager 405 starts up the received use application.

On the other hand, if the last-use application is not already received in step S731 (NO in step S731), the application manager 405 determines whether or no the last-use application is received (step S734), and every time a use application is received, the application manager 405 starts the received use application in steps S732 to S735.

If the last-use application is received during the processes in steps S732 to S735, the application manager 405 starts the last-use application (step S738). After that, in steps S739 to S741, every time a use application other than the last-use application is received, the application manager 405 starts the received use application, as described earlier.

If use applications other than the last-use application are all received before the last-use application, and the use applications other than the last-use application are all started before the last-use application, the last-use application is started (step S737) when the last-use application is received (YES in step S736).

As will be described later, the last-use application is transmitted from the application management apparatus 103 before other use applications, but each use application may arrive at the information processing apparatus 100 earlier depending on communication conditions.

With the above-described processes, the information processing apparatus 100 completes the startup process (step S750).

In the application management apparatus 103, when the startup process is started in step S801, a startup process of the OS 501 is started in step S802.

Next, when the startup process of the OS 501 is completed in step S803, the overall application manager 502 is started in step S804.

If the reception unit 503 of the overall application manager 502 receives the use application notification information from the information processing apparatus 100 via the communication device 304 (YES in step S805), the application acquisition unit 504 acquires a last-use application, a use application, last-use data, and use data from the ROM 303 in accordance with the use application notification information in step S806.

Finally, in step S807, the transmission unit 505 transmits the last-use application, the use application, the last-use data, and the use data acquired by the application acquisition unit 504 to the information processing apparatus 100.

The transmission unit 505 preferentially transmits the last-use application and the last-use data. The transmission unit 505 transmits the use application and the use data after the transmission of the last-use application and the last-use data.

Examples of operations at the time of shutdown will next be described with reference to FIGS. 10 and 11.

Note that a description of processes not related to features of the present embodiment (for example, an OS shutdown process and a poweroff process) will be omitted below.

When the in-vehicle system 10 is shut down, the information processing apparatus 100 starts a shutdown process in step S901.

Next, in step S902, the application manager 405 of the information processing apparatus 100 transmits an identifier and use result information of a user to the application management apparatus 103.

An identifier of an application last use in the information processing apparatus 100 and an identifier of data used by the application, and an identifier of an application having a result of being used before the start of the shutdown process and an identifier of data used by the application are included in the use result information. Alternatively, an application itself and data itself may be included in the use result information.

Next, in step S903, the application manager 405 of the information processing apparatus 100 receives, from the application management apparatus 103, identifiers and pieces of use result information of all users that use the vehicle, that is, all users recognized in the in-vehicle system 10. Note that, if there is a user which has not used any application, the application manager 405 may receive an identifier and use result information only for a user with a use result of application.

Next, in step S904, the application manager 405 updates the application table 600 using the pieces of use result information received in step S903.

In step S905, the application manager 405 deletes applications and pieces of data saved in the ROM 205.

After that, the information processing apparatus 100 completes the shutdown process (step S906).

When the in-vehicle system 10 is shut down, the application management apparatus 103 starts a shutdown process in step S1001.

Next, in step S1002, the application acquisition unit 504 of the application management apparatus 103 receives the identifier and the use result information of a user from the information processing apparatus 100 via the reception unit 503.

When identifiers and pieces of use result information of users are received from all the information processing apparatuses 100 in operation (YES in step S1003), the application acquisition unit 504 transmits identifiers and pieces of use result information of all users to all the information processing apparatuses 100 in operation via the transmission unit 505 in step S1004 and completes the shutdown process (step S1005).

As described earlier, the application acquisition unit 504 may transmit an identifier and use result information only for a user with a use result of application.

Description of Advantageous Effects of Embodiment

As described above, the application management apparatus 103 can optimally arrange an application and data to be used by a user in an information processing apparatus 100 to be used by the user.

Thus, all applications and all pieces of data need not be saved in advance in the information processing apparatus 100. Therefore, it is possible to efficiently use resources in the whole in-vehicle system 10.

Additionally, since the second OS 404 for causing an application to operate is arranged, the information processing apparatus 100 can start an application at high speed.

In addition, since pieces of use result information of all the users are transmitted to each information processing apparatus 100 at the time of shutdown, each information processing apparatus 100 can update the application table 600. Since each information processing apparatus 100 can use the updated application table 600 at the time of next startup, any user that uses the information processing apparatus 100 can start up the information processing apparatus 100 at high speed in a state in which applications to be used therein are arranged.

Note that although applications are deleted in step S905 of FIG. 10 in the above description, step S905 may be omitted. That is, the application manager 405 may keep the applications left in the ROM 205.

In this case, in step S713 of FIG. 7, the service manager 402 determines whether at least one application out of a last-use application and a use application identified through reference to the application table 600 is present in the ROM 205. If at least one application out of the last-use application and the use application is present in the ROM 205, the service manager 402 transmits use application notification information notifying of only an application not present in the ROM 205 to the application management apparatus 103.

For last-use data and use data as well, the service manager 402 transmits use application notification information notifying of only data not present in the ROM 205 to the application management apparatus 103.

Embodiment 2

In Embodiment 1, each information processing apparatus 100 holds the application table 600. The present embodiment will describe an example in which the application management apparatus 103 holds the application table 600.

The present embodiment mainly describes differences from Embodiment 1.

Note that matters not described in the present embodiment are the same as those in Embodiment 1.

In the present embodiment, the application table 600 is stored in a ROM 303 of the application management apparatus 103. The application table 600 in the present embodiment is the same as that illustrated in FIG. 6.

In the present embodiment, when a startup process of an information processing apparatus 100 is started, a service manager 402 of the information processing apparatus 100 transmits user notification information to the application management apparatus 103. The user notification information is information that notifies of an identifier of a user of the information processing apparatus 100 (a start-up information processing apparatus) which starts the startup process.

An application acquisition unit 504 of the application management apparatus 103 refers to the application table 600 on the basis of the identifier of the user, notified of by the user notification information, and identifies a last-use application, a use application, last-use data, and use data for the user of the information processing apparatus 100. The application acquisition unit 504 then acquires the identified last-use application, use application, last-use data, and use data from the ROM 303.

An example of operation at the time of startup of the information processing apparatus 100 according to the present embodiment will next be described.

Figure 12:
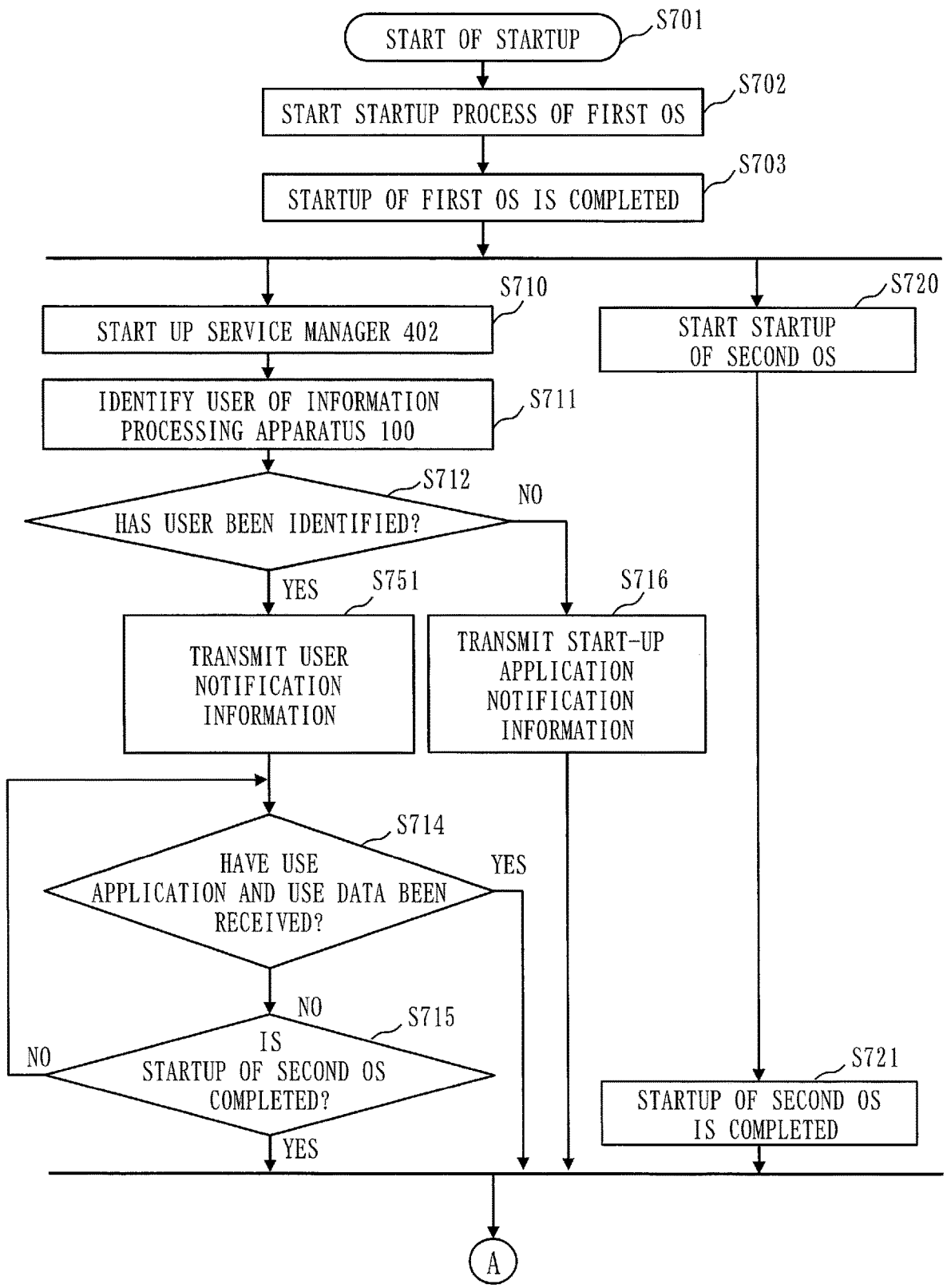
FIG. 12 is a flowchart illustrating an example of operation at the time of startup of an information processing apparatus according to Embodiment 2.

FIG. 12 corresponds to FIG. 7 described in Embodiment 1.

In FIG. 12, step S751 is performed instead of step S713 of FIG. 7.

In step S751, the service manager 402 transmits user notification information to the application management apparatus 103. The user notification information indicates an identifier of a user identified in step S712.

Processes other than that in step S751 of FIG. 12 are the same as those in FIG. 7, and a description thereof will be omitted.

After the processes in FIG. 12, the processes in FIG. 8 are performed, as in Embodiment 1.

An example of operation at the time of startup of the application management apparatus 103 according to the present embodiment will next be described.

Figure 13:
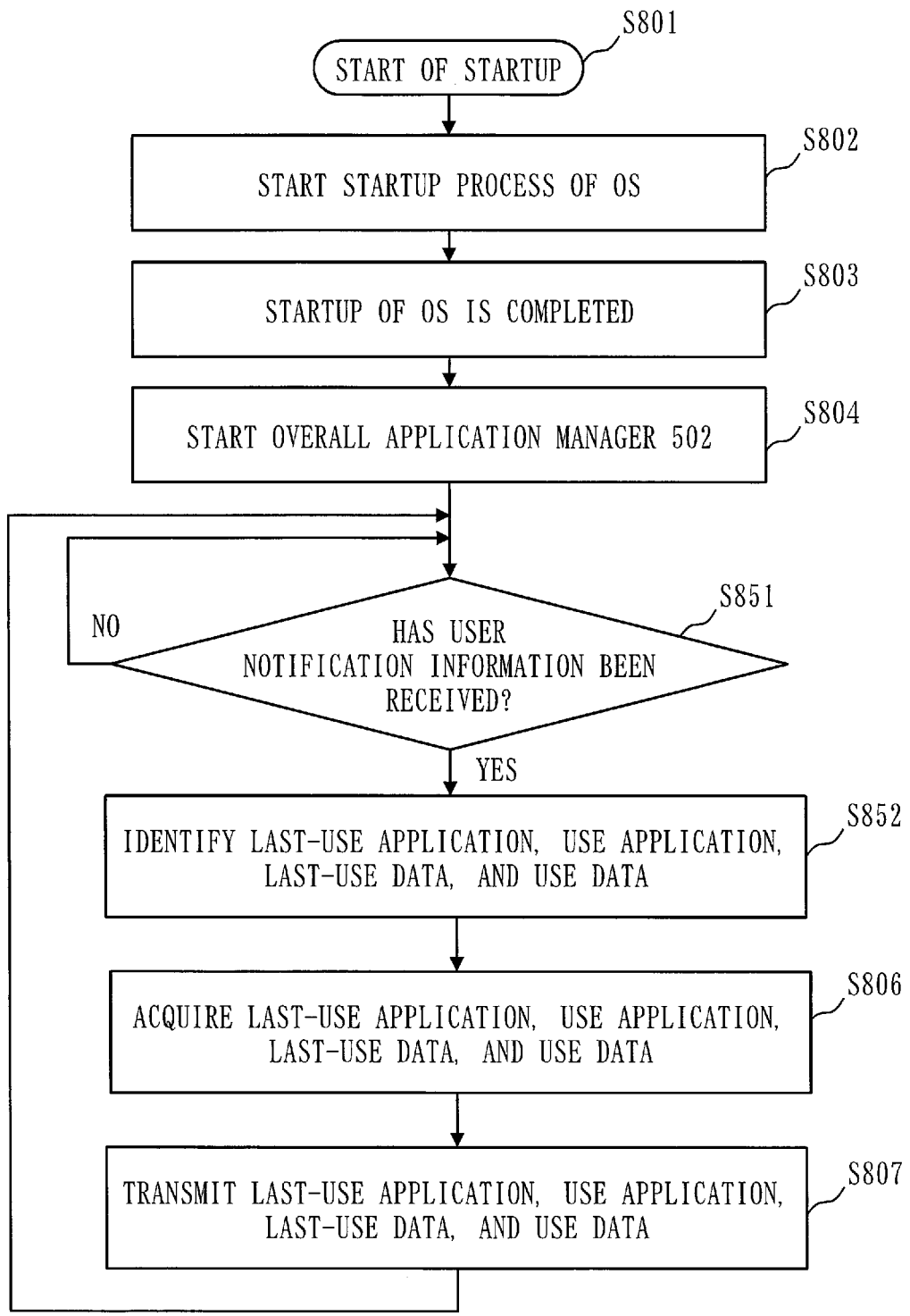
FIG. 13 is a flowchart illustrating an example of operation at the time of startup of an application management apparatus according to Embodiment 2.

FIG. 13 corresponds to FIG. 9 described in Embodiment 1.

In FIG. 13, step S851 is performed instead of step S805 of FIG. 9, and step S852 is additionally performed.

That is, if a reception unit 503 receives user notification information from the information processing apparatus 100 via a communication device 304 (YES in step S851), the application acquisition unit 504 identifies a last-use application, a use application, last-use data, and use data in step S852.

That is, the application acquisition unit 504 refers to the application table 600 using the identifier of the user included in the user notification information. The application acquisition unit 504 then identifies the last-use application, the use application, the last-use data, and the use data for the corresponding user.

After that, in step S806, the application acquisition unit 504 acquires the last-use application, the use application, the last-use data, and the use data from the ROM 303.

Processes other than those in steps S851 and S852 of FIG. 13 are the same as those in FIG. 9, and a description thereof will be omitted.

An example of operation at the time of shutdown of the information processing apparatus 100 according to the present embodiment will next be described.

Figure 14:
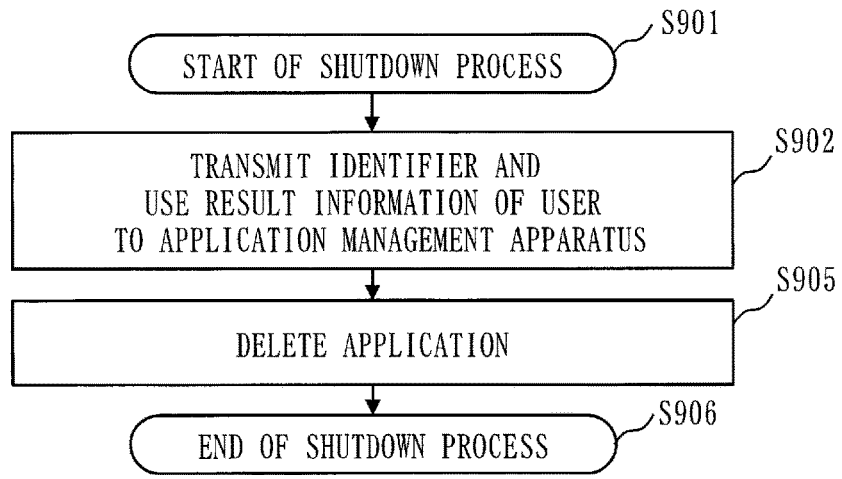
FIG. 14 is a flowchart illustrating an example of operation at the time of shutdown of the information processing apparatus according to Embodiment 2.

FIG. 14 corresponds to FIG. 10 described in Embodiment 1.

In FIG. 14, steps S903 and S904 in FIG. 10 are not performed.

That is, in the information processing apparatus 100, applications and pieces of data in a ROM 205 are deleted (step S905) after identifiers and pieces of use result information of users are transmitted (step S902).

As in Embodiment 1, the process in step S905 may be omitted.

An example of operation at the time of shutdown of the application management apparatus 103 according to the present embodiment will next be described.

Figure 15:
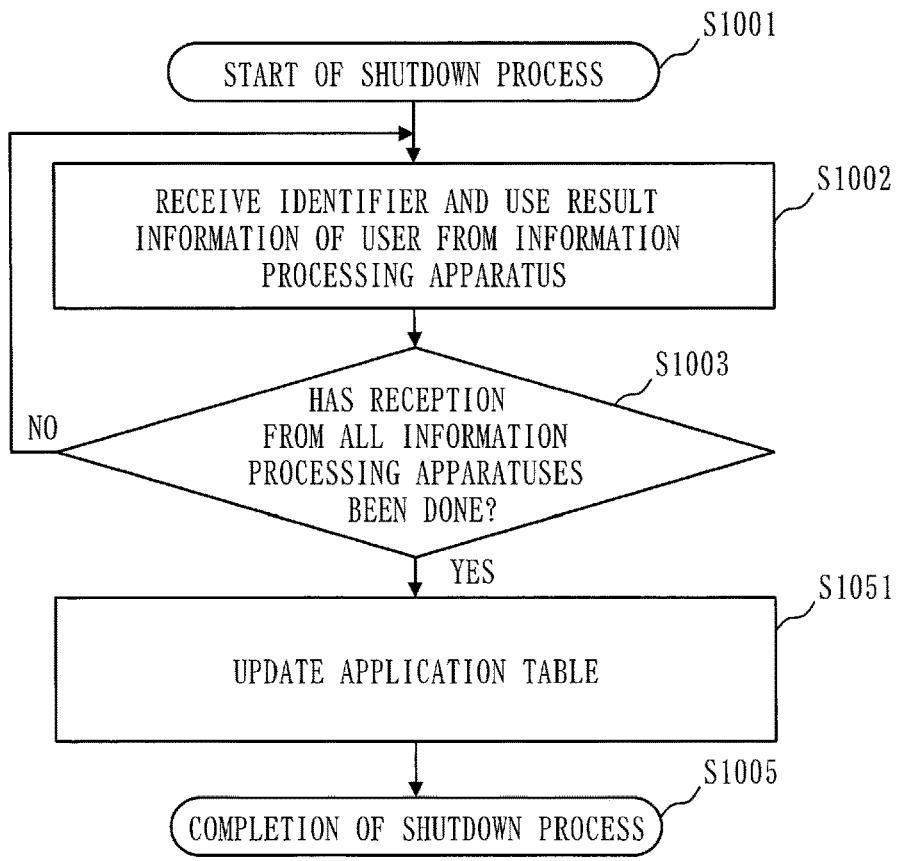
FIG. 15 is a flowchart illustrating an example of operation at the time of shutdown of the application management apparatus according to Embodiment 2.

FIG. 15 corresponds to FIG. 11 described in Embodiment 1.

In FIG. 15, step S1051 is performed instead of step S1004 of FIG. 11.

That is, when the application acquisition unit 504 receives identifiers and pieces of use result information of users from all the information processing apparatuses 100 in operation (YES in step S1003), the application acquisition unit 504 updates the application table 600 in step S1051, using the pieces of use result information received in step S1003.

Processes other than that in step S1051 in FIG. 15 are the same as those in FIG. 11, and a description thereof will be omitted.

According to the present embodiment, in addition to the advantageous effects described in Embodiment 1, each information processing apparatus 100 need not hold the application table 600. Therefore, it is possible to efficiently use resources of each information processing apparatus 100.

Embodiment 3

The present embodiment will describe a configuration in which an information processing apparatus 100 also serves as the application management apparatus 103 described in Embodiment 1.

The present embodiment mainly describes differences from Embodiment 1.

Note that matters not described in the present embodiment are the same as those in Embodiment 1.

Figure 16:
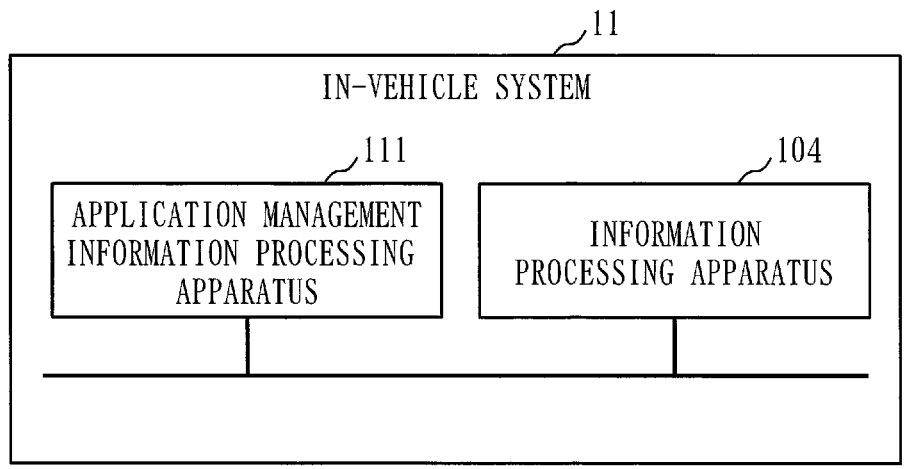
FIG. 16 is a diagram illustrating an example of a configuration of an in-vehicle system according to Embodiment 3.

FIG. 16 illustrates an example of a configuration of an in-vehicle system 11 according to the present embodiment.

As illustrated in FIG. 16, the in-vehicle system 11 according to the present embodiment includes an information processing apparatus 104 and an application management information processing apparatus 111.

For example, the information processing apparatus 104 is arranged for a front seat of a vehicle while the application management information processing apparatus 111 is arranged for a backseat.

The application management information processing apparatus 111 is an information processing apparatus which has functions of the application management apparatus 103 described in Embodiment 1.

Although an ordinary information processing apparatus is only the information processing apparatus 104 in FIG. 16, the number of ordinary information processing apparatuses included in the in-vehicle system 11 may be equal to or more than two.

Figure 17:
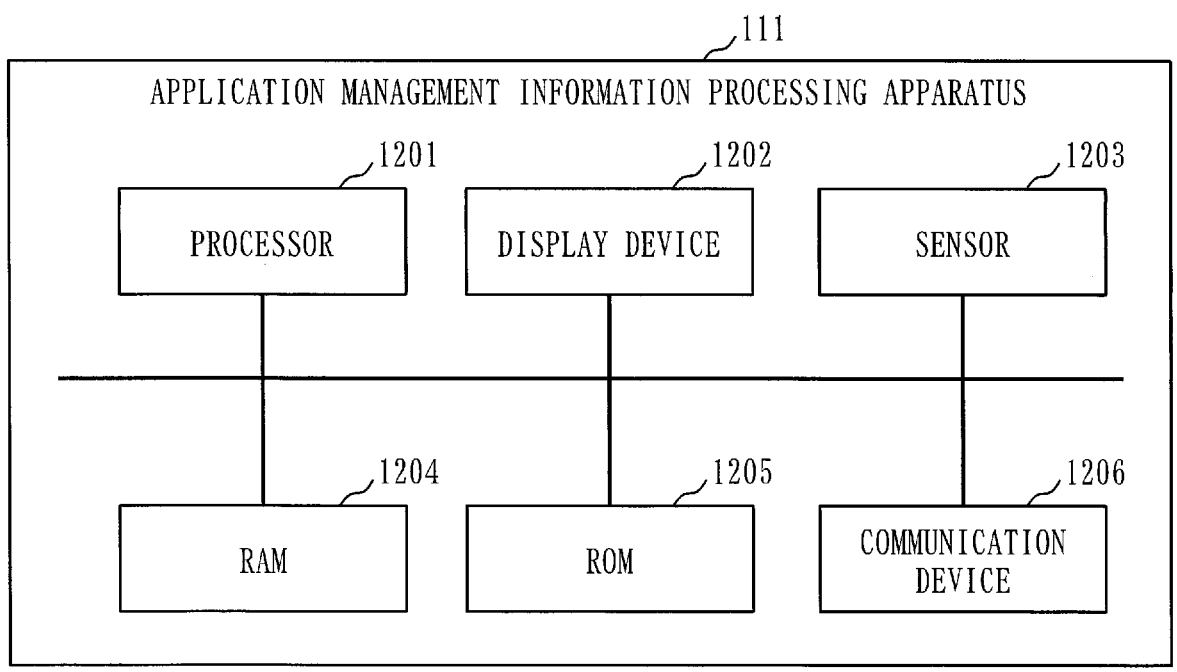
FIG. 17 is a diagram illustrating an example of a hardware configuration of an application management information processing apparatus according to Embodiment 3.

FIG. 17 illustrates an example of a hardware configuration of the application management information processing apparatus 111.

The hardware configuration of the application management information processing apparatus 111 is the same as that of the information processing apparatus 100 illustrated in FIG. 2.

In the application management information processing apparatus 111, applications to be used by all users are stored in a ROM 1205. Other elements in FIG. 17 are the same as those illustrated in FIG. 2, and a description thereof will be omitted.

Figure 18:
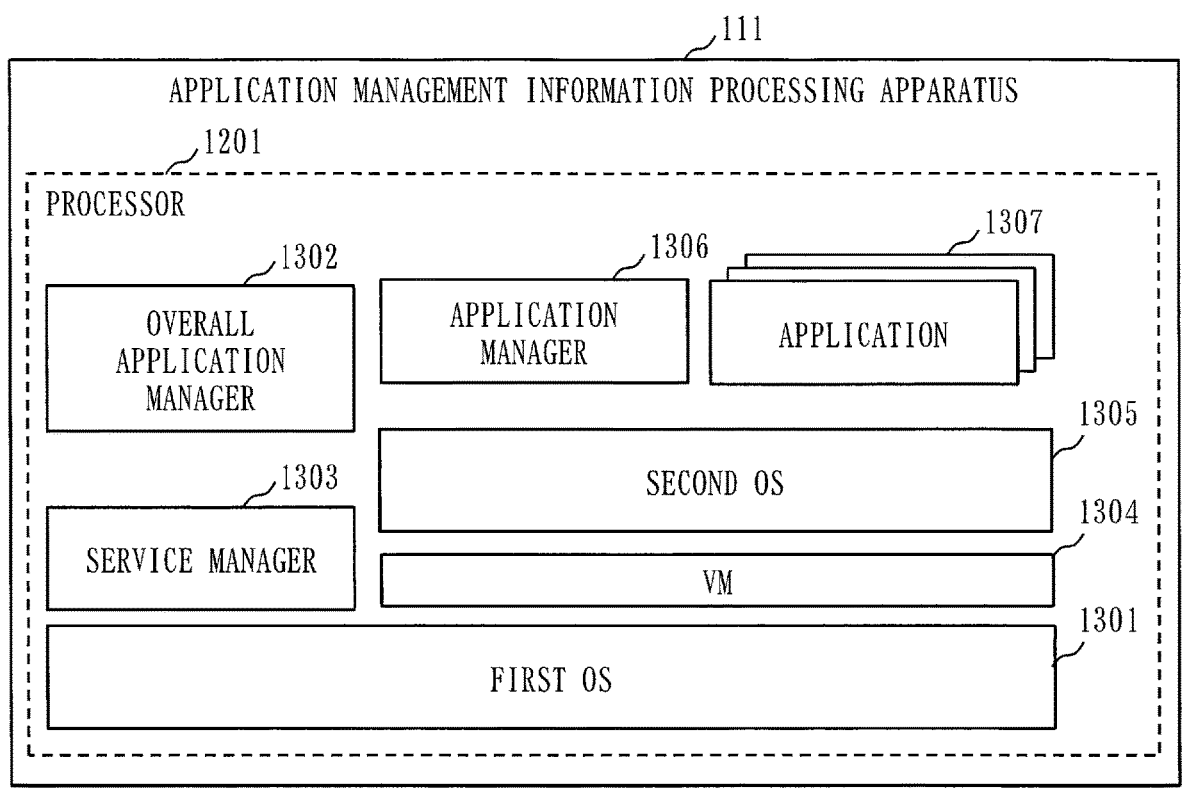
FIG. 18 is a diagram illustrating an example of a functional configuration of the application management information processing apparatus according to Embodiment 3.

FIG. 18 illustrates an example of a functional configuration of the application management information processing apparatus 111.

A first OS 1301 is the same as the first OS 401 in FIG. 4, and a description thereof will be omitted.

A service manager 1303 is the same as the service manager 402 in FIG. 4, and a description thereof will be omitted.

A VM 1304 is the same as the VM 403 in FIG. 4, and a description thereof will be omitted.

A second OS 1305 is the same as the second OS 404 in FIG. 4, and a description thereof will be omitted.

An application manager 1306 is the same as the application manager 405 in FIG. 4, and a description thereof will be omitted.

Applications 1307 are the same as the applications 406 in FIG. 4, and a description thereof will be omitted.

An overall application manager 1302 is the same as the overall application manager 502 in FIG. 5. Therefore, the overall application manager 1302 includes a reception unit 503, an application acquisition unit 504, and a transmission unit 505, as in FIG. 5, though the units are not illustrated in FIG. 18 for convenience of illustration. The reception unit 503, the application acquisition unit 504, and the transmission unit 505 in the overall application manager 1302 are the same as those illustrated in Embodiment 1.

At least any of information, data, a signal value, and a variable value obtained through execution of the software illustrated in FIG. 18 is stored in at least any of a RAM 1204, the ROM 1205, and a register and a cache memory in a processor 1201.

The software illustrated in FIG. 18 may be stored in a portable storage medium, such as a magnetic disk, a flexible disk, an optical disc, a compact disc, a Blu-ray (registered trademark) disc, or a DVD.

The software illustrated in FIG. 18 can also be treated as a "circuit", a "step", a "procedure", or a "process".

Some of the software illustrated in FIG. 18 may be implemented by a processing circuit. The processing circuit is, for example, a logic IC, a GA, an ASIC, or an FPGA.

Operation according to the present embodiment will next be described.

Figure 19:
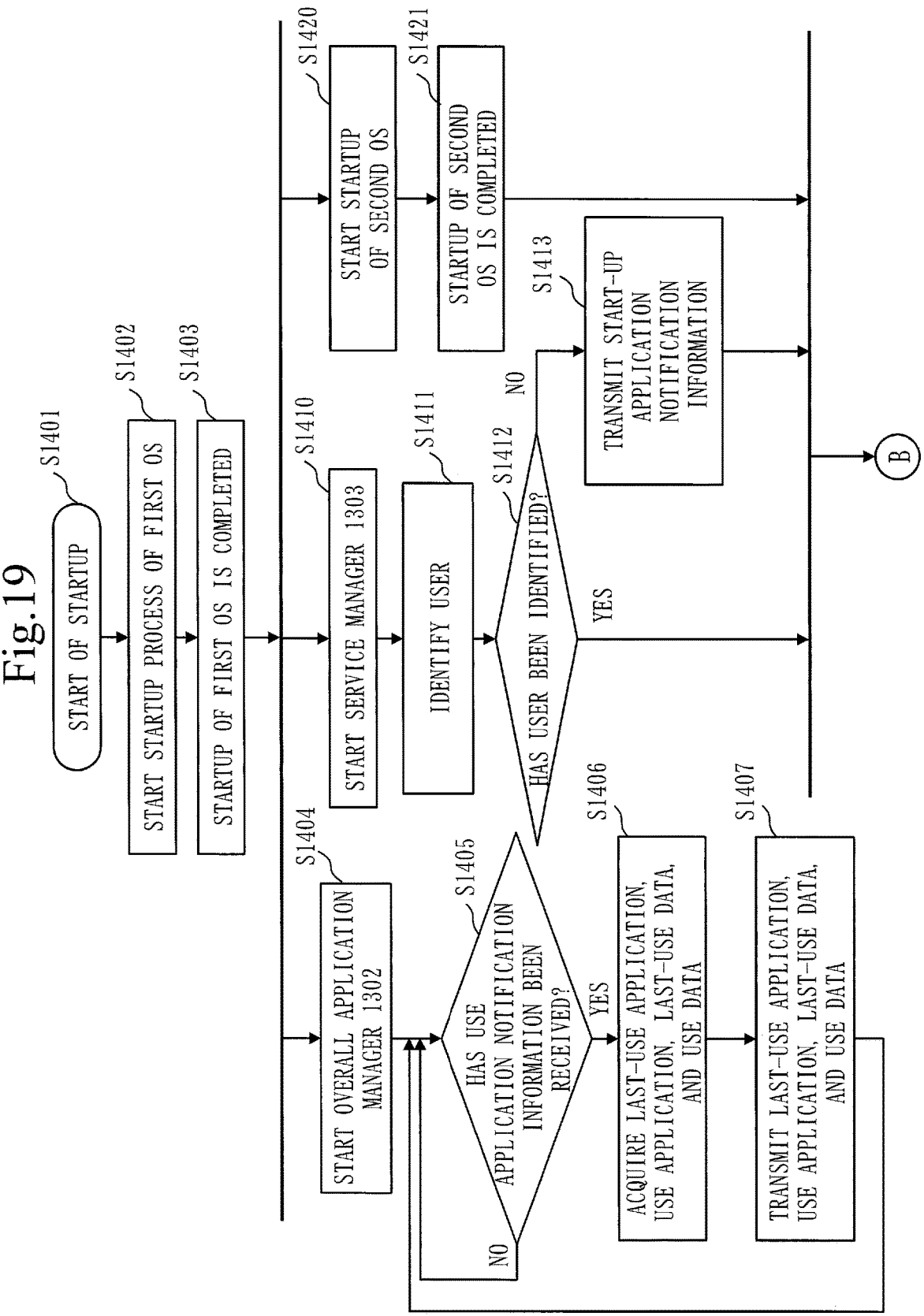
FIG. 19 is a flowchart illustrating an example of operation at the time of startup of the application management information processing apparatus according to Embodiment 3.
Figure 20:
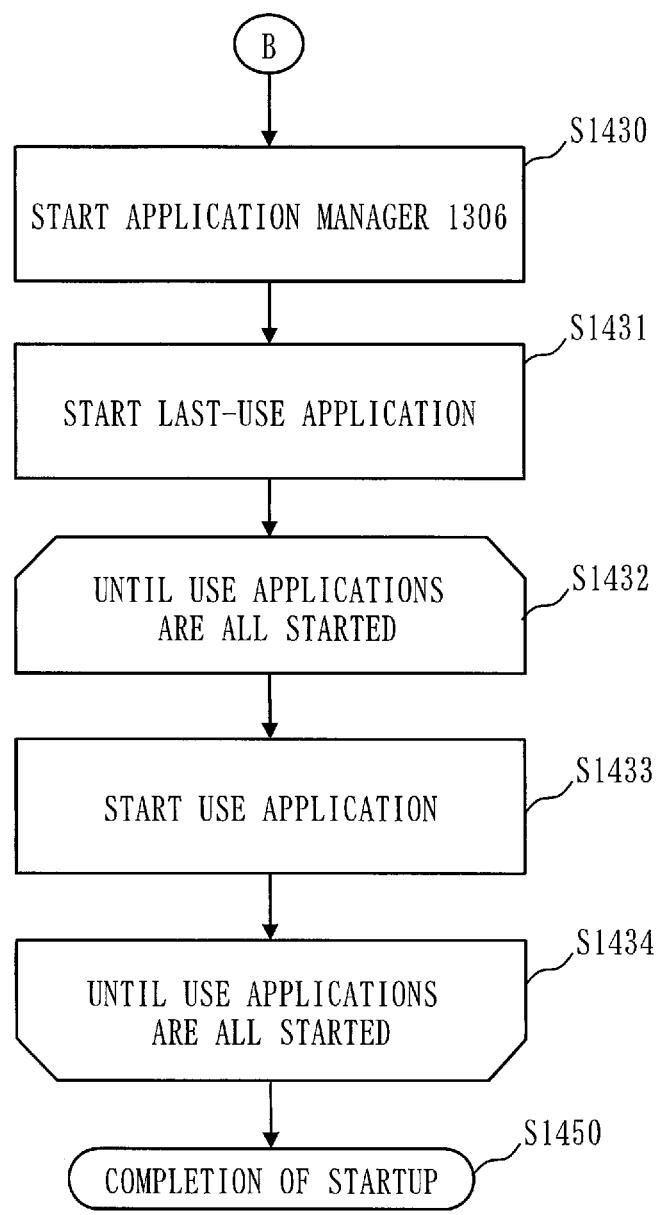
FIG. 20 is a flowchart illustrating the example of the operation at the time of startup of the application management information processing apparatus according to Embodiment 3.

FIGS. 19 and 20 illustrate an example of operation at the time of startup of the application management information processing apparatus 111.

Figure 21:
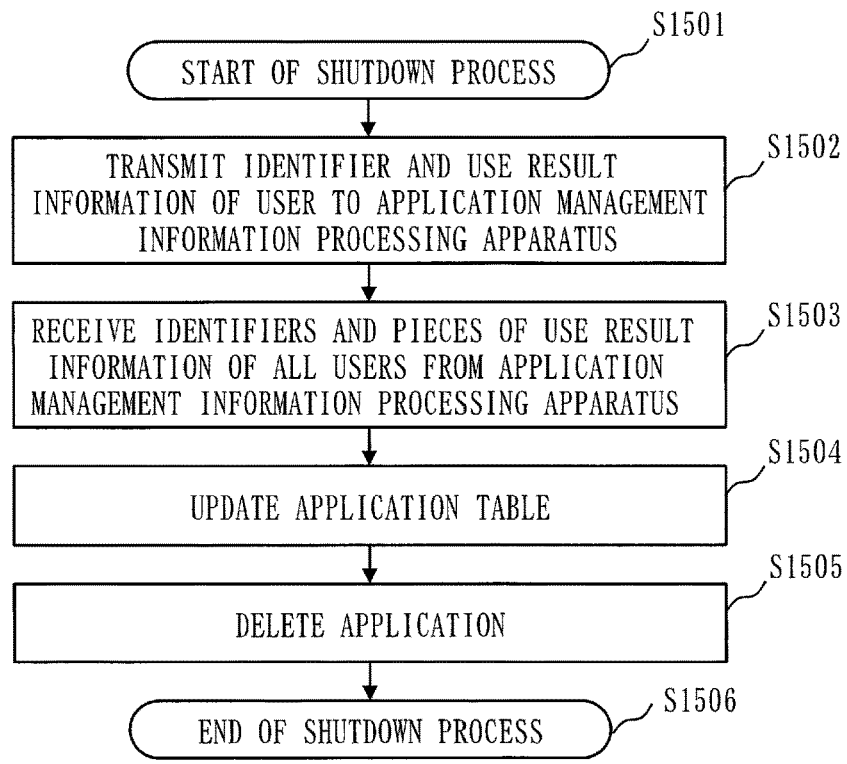
FIG. 21 is a flowchart illustrating an example of operation at the time of shutdown of an information processing apparatus according to Embodiment 3.

FIG. 21 illustrates an example of operation at the time of shutdown of the information processing apparatus 104.

Figure 22:
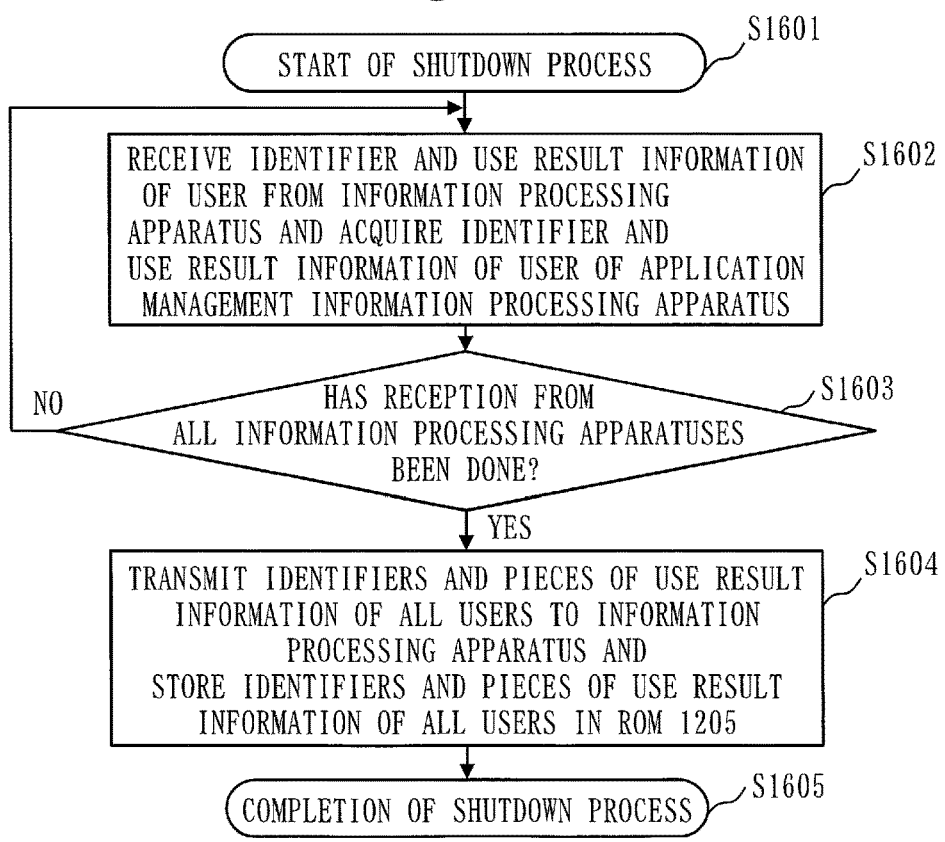
FIG. 22 is a flowchart illustrating an example of operation at the time of shutdown of the application management information processing apparatus according to Embodiment 3.

FIG. 22 illustrates an example of operation at the time of shutdown of the application management information processing apparatus 111.

The operations at the time of startup will be described first with reference to FIGS. 7, 8, 19, and 20.

At the time of startup of the in-vehicle system 11, the information processing apparatus 104 starts a startup process (step S701), and the application management information processing apparatus 111 starts a startup process (step S1401).

Operation at the time of startup of the information processing apparatus 104 is as illustrated in FIG. 7. While the service manager 402 transmits use application notification information to the application management apparatus 103 in step S713 in Embodiment 1, a service manager 402 transmits use application notification information to the application management information processing apparatus 111 in the present embodiment.

Other processes are as described in Embodiment 1, and a description thereof will be omitted.

After the processes in FIG. 7, the processes in FIG. 8 are performed, as in Embodiment 1.

The application management information processing apparatus 111 operates in accordance with FIGS. 19 and 20.

Processes in FIGS. 19 and 20 are a combination of the processes in FIGS. 7 and 8 and the processes in FIG. 9.

Step S1402 is the same as step S702.
Step S1403 is the same as step S703.
Step S1410 is the same as step S710.
Step S1411 is the same as step S711.
Step S1413 is the same as step S716.
Step S1420 is the same as step S720.
Step S1421 is the same as step S721.
Step S1430 is the same as step S722.
Step S1431 is the same as step S738.
Step S1432 is the same as step S739.
Step S1433 is the same as step S740.
Step S1434 is the same as step S741.
Step S1450 is the same as step S750.
Step S1404 is the same as step S804.
Step S1405 is the same as step S805.
Step S1406 is the same as step S806.
Step S1407 is the same as step S807.

That is, the application management information processing apparatus 111 identifies a user of the application management information processing apparatus 111 and starts a last-use application and a use application of the identified user, like the information processing apparatus 100 according to Embodiment 1. Note that since the application management information processing apparatus 111 holds applications in the ROM 1205, transmission of the use application notification information is not required, and the application management information processing apparatus 111 can refer to the application table 600 and acquire the last-use application, the use application, the last-use data, and the use data of the user from the ROM 1205.

If the application management information processing apparatus 111 receives the use application notification information from the information processing apparatus 104, like the application management apparatus 103 according to Embodiment 1, the application management information processing apparatus 111 acquires the last-use application, the use application, the last-use data, and the use data of the user of the information processing apparatus 104 from the ROM 1205. The application management information processing apparatus 111 transmits the acquired last-use applications, use application, last-use data, and use data to the information processing apparatus 104.

The operations at the time of shutdown will next be described with reference to FIGS. 21 and 22.

FIG. 21 illustrates an example of the operation at the time of shutdown of the information processing apparatus 104.

FIG. 22 illustrates an example of the operation at the time of shutdown of the application management information processing apparatus 111.

Note that a description of processes not related to features of the present embodiment (for example, an OS shutdown process and a poweroff process) will be omitted below.

FIG. 21 corresponds to FIG. 10 described in Embodiment 1.

Step S1501 is the same process as step S901 of FIG. 10.
Step S1502 is the same process as step S902 of FIG. 10.

In step S1502, an application manager 405 of the information processing apparatus 104 transmits an identifier and use result information of a user to the application management information processing apparatus 111. The use result information is the same as that described in Embodiment 1.

Step S1503 is the same process as step S903 of FIG. 10.

In step S1503, the application manager 405 of the information processing apparatus 104 receives, from the application management information processing apparatus 111, identifiers and pieces of use result information of all users that use the vehicle, that is, all users recognized in the in-vehicle system 11.

Step S1504 is the same process as step S904 of FIG. 10.

In step S1504, the application manager 405 updates the application table 600 using the pieces of use result information received in step S1503.

Step S1505 is the same process as step S905 of FIG. 10.

In step S1505, the application manager 405 deletes applications and pieces of data saved in a ROM 205.

After that, the information processing apparatus 104 completes the shutdown process (step S1506).

FIG. 22 corresponds to FIG. 11 described in Embodiment 1.

Step S1601 is the same process as step S1001 of FIG. 10.

Step S1602 is the same process as step S1002 of FIG. 10.

In step S1602, the application acquisition unit 504 of the application management information processing apparatus 111 receives an identifier and use result information of a user from the information processing apparatus 104 via the reception unit 503. The application acquisition unit 504 acquires an identifier and use result information of a user of the application management information processing apparatus 111 itself.

Step S1603 is the same process as step S1003 of FIG. 10 and Step S1604 is the same process as step S1004 of FIG. 10.

That is, when the application acquisition unit 504 receives the identifier and the use result information of the user from the information processing apparatus 104 and acquires the identifier and the use result information of the user of the application management information processing apparatus 111 itself (YES in step S1603), the application acquisition unit 504 transmits the identifiers and the pieces of use result information of all the users to the information processing apparatus 104 via the transmission unit 505 and stores the identifiers and the pieces of use result information of all the users in the ROM 1205 of the application management information processing apparatus 111 in step S1604.

After that, the application management information processing apparatus 111 completes the shutdown process (step S1605).

According to the present embodiment, in addition to the advantageous effects described in Embodiment 1, the application management apparatus 103 described in Embodiment 1 is not required. Therefore, it is possible to simplify a configuration of an in-vehicle system.

Note that the present embodiment has described the application management information processing apparatus 111 having the functions of the application management apparatus 103 described in Embodiment 1. Alternatively, the application management information processing apparatus 111 having functions of the application management apparatus 103 described in Embodiment 2 may be used. That is, user notification information may be used instead of use application notification information.

Embodiment 4

The present embodiment will describe an example of operation in a case where a user is changed in an information processing apparatus.

The present embodiment mainly describes differences from Embodiment 1.

Note that matters not described in the present embodiment are the same as those in Embodiment 1.

Figure 23:
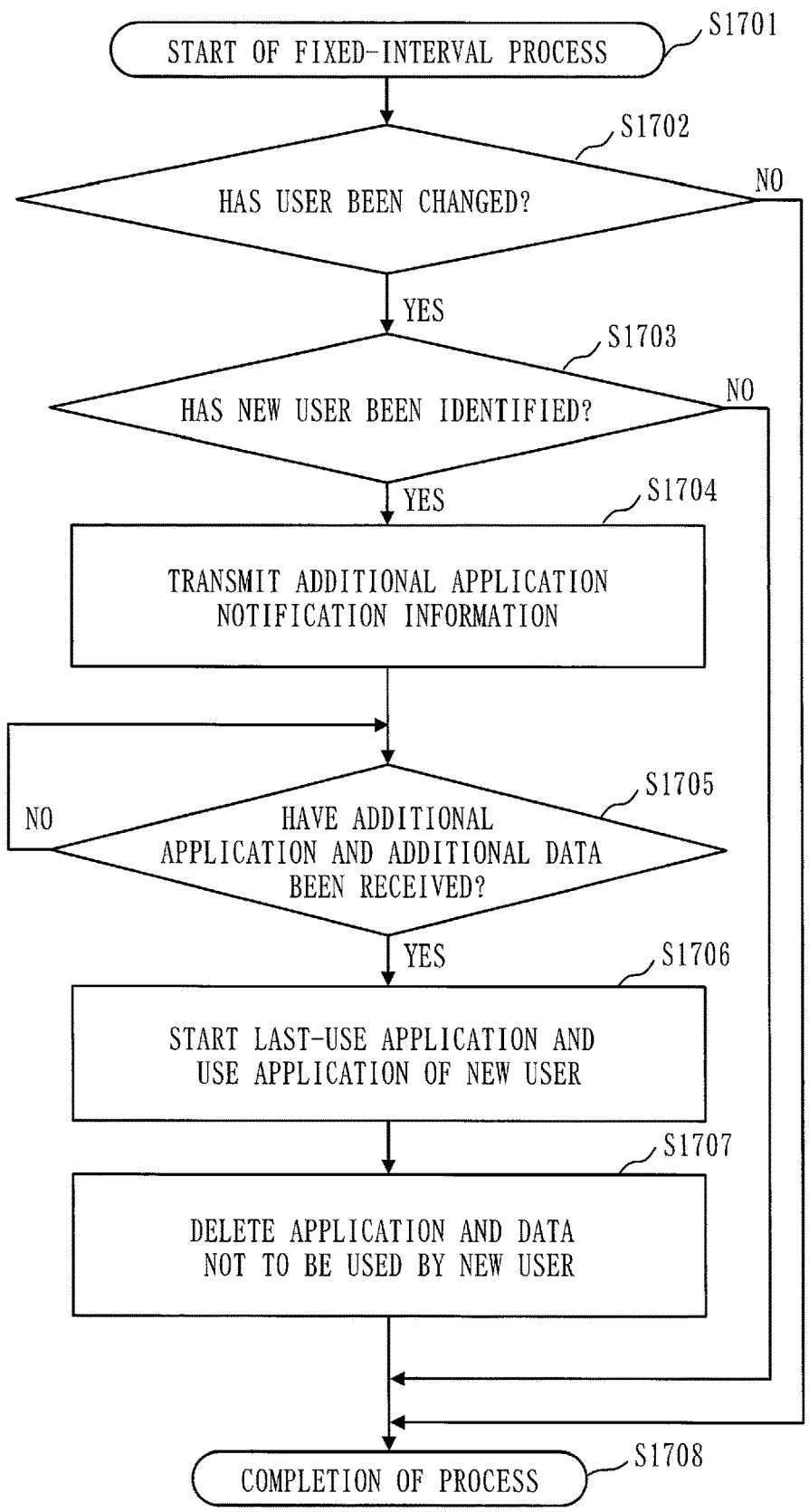
FIG. 23 is a flowchart illustrating an example of operation of an information processing apparatus according to Embodiment 4.

FIG. 23 illustrates an example of operation of an information processing apparatus 100 according to the present embodiment.

During a startup process or after completion of the startup process, an application manager 405 of the information processing apparatus 100 starts a fixed-interval process in step S1701. The application manager 405 starts the fixed-interval process at intervals of, for example, one second.

If the application manager 405 detects a user change (YES in step S1702), the application manager 405 identifies a new user in step S1703.

If the new user is identified (YES in step S1703), the application manager 405 transmits additional application notification information to an application management apparatus 103 in step S1704.

More specifically, the application manager 405 compares, for the new user, an application table 600 with applications and pieces of data saved in a ROM 205 of the information processing apparatus 100.

The application manager 405 then identifies an application not saved in the ROM 205 out of a last-use application and a use application for the new user. The application identified by the application manager 405 is referred to as an additional application program. The additional application program will hereinafter also be referred to as an additional application.

The application manager 405 also identifies data not saved in the ROM 205 out of pieces of data to be used by the last-use application and the use application of the new user. The data identified by the application manager 405 is referred to as additional data.

The application manager 405 then transmits additional application notification information notifying of the additional application and the additional data to the application management apparatus 103.

When the application manager 405 receives all of the additional application and the additional data from the application management apparatus 103 (YES in step S1705), the application manager 405 starts the last-use application and the use application of the new user including the additional application using last-use data and use data of the new user including the additional data in step S1706.

The application manager 405 then deletes an application and data not to be use by the new user out of the applications and the pieces of data saved in the ROM 205 in step S1707.

After that, the information processing apparatus 100 completes the fixed-interval process (step S1708).

Note that although the operation of the information processing apparatus 100 has been described above, the same applies to operation of an information processing apparatus 104.

The information processing apparatus 104 transmits additional application notification information to the application management information processing apparatus 111 and receives an additional application and additional data from the application management information processing apparatus 111.

As seen from the above, even if there is a change in a user of an information processing apparatus, a last-use application, a use application, last-use data, and use data of a new user can be optimally arranged in the information processing apparatus.

Additionally, only an application and data which an information processing apparatus lacks are transmitted. Therefore, it is possible to reduce consumption of communication resources.

In addition, it is possible to start execution of an application already stored in an information processing apparatus out of applications to be used by a new user without waiting for transmission from an application management apparatus and enhance convenience of users.

Embodiment 5

The present embodiment will describe a modification of Embodiment 4.

The present embodiment mainly describes differences from Embodiment 4.

Note that matters not described in the present embodiment are the same as those in Embodiment 4.

Figure 24:
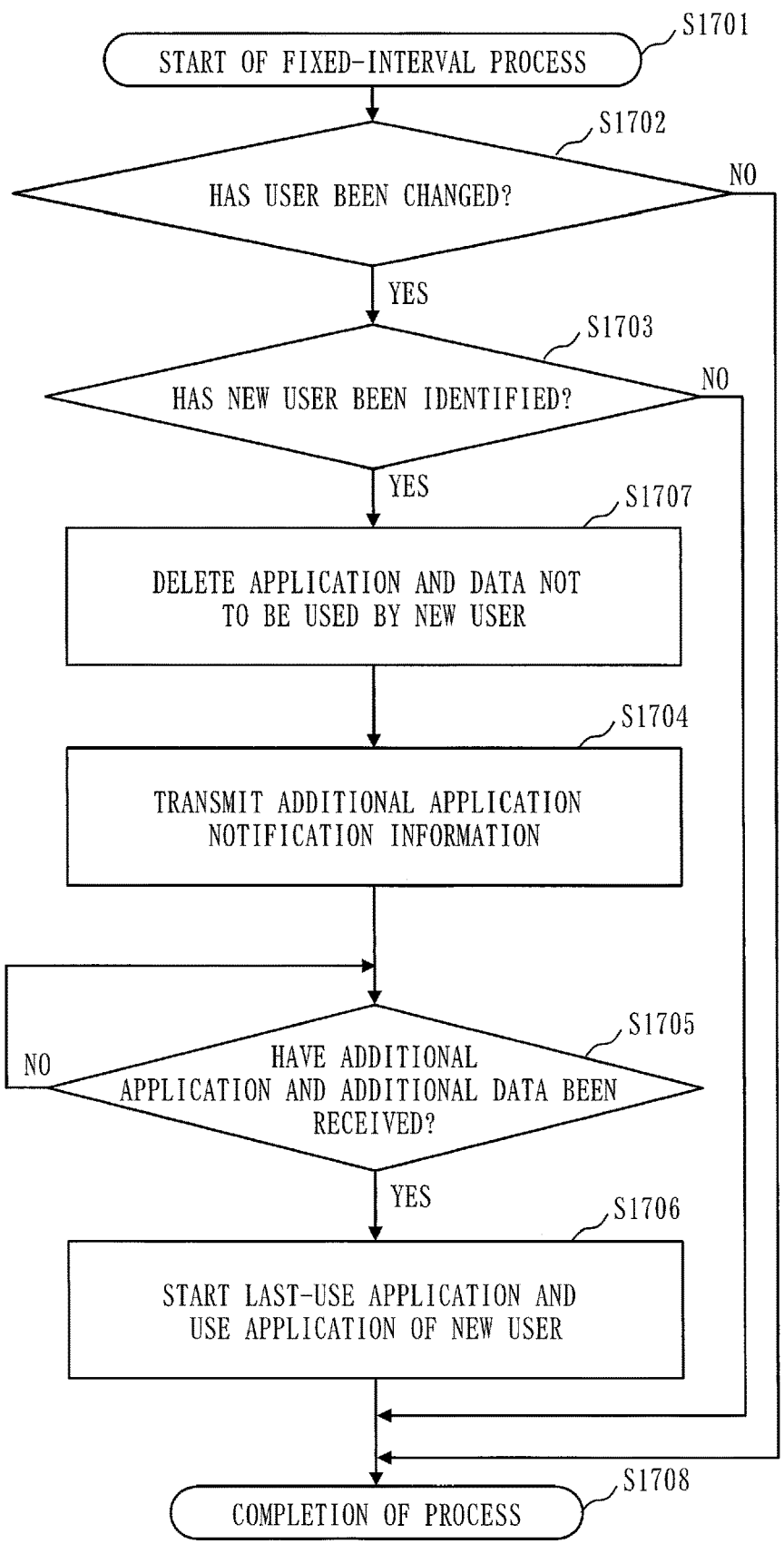
FIG. 24 is a flowchart illustrating an example of operation of an information processing apparatus according to Embodiment 5.

FIG. 24 illustrates an example of operation of an information processing apparatus 100 according to the present embodiment.

FIG. 24 is different from FIG. 23 in the order of execution of processing steps.

During a startup process or after completion of the startup process, an application manager 405 of the information processing apparatus 100 starts a fixed-interval process in step S1701.

If the application manager 405 detects a user change (YES in step S1702), the application manager 405 identifies a new user in step S1703.

If the new user is identified (YES in step S1703), the application manager 405 deletes an application and data not to be used by the new user out of applications and pieces of data saved in a ROM 205 in step S1707.

Next, in step S1704, the application manager 405 transmits additional application notification information to an application management apparatus 103.

When the application manager 405 receives all of an additional application and additional data from the application management apparatus 103 (YES in step S1705), the application manager 405 starts a last-use application and a use application of the new user including the additional application using last-use data and use data of the new user including the additional data in step S1706.

After that, the information processing apparatus 100 completes the fixed-interval process (step S1708).

Note that although the operation of the information processing apparatus 100 has been described above, the same applies to operation of an information processing apparatus 104.

The information processing apparatus 104 transmits additional application notification information to an application management information processing apparatus 111 and receives an additional application and additional data from the application management information processing apparatus 111.

As seen from the above, even if there is a change in a user of an information processing apparatus, a last-use application, a use application, last-use data, and use data of a new user can be optimally arranged in the information processing apparatus in the present embodiment as well.

Additionally, only an application and data which an information processing apparatus lacks are transmitted. Therefore, it is possible to reduce consumption of communication resources.

In addition, it is possible to start execution of an application already stored in an information processing apparatus out of applications to be used by a new user without waiting for transmission from an application management apparatus and enhance convenience of users.

The embodiments of the present invention have been described above. Two or more of the embodiments may be combined and carried out.

Alternatively, one of the embodiments may be partially carried out.

Alternatively, two or more of the embodiments may be partially combined and carried out.

Note that the present invention is not limited to the embodiments and that the embodiments can be variously changed, as needed.

REFERENCE SIGNS LIST

10: in-vehicle system; 11: in-vehicle system; 100: information processing apparatus; 101: information processing apparatus (1); 102: information processing apparatus (2); 103: application management apparatus; 104: information processing apparatus; 111: application management information processing apparatus; 201: processor; 202: display device; 203: sensor; 204: RAM; 205: ROM; 206: communication device; 301: processor; 302: RAM; 303: ROM; 304: communication device; 401: first OS; 402: service manager; 403: VM; 404: second OS; 405: application manager; 406: application; 501: OS; 502: overall application manager; 503: reception unit; 504: application acquisition unit; 505: transmission unit; 600: application table; 1201: processor; 1202: display device; 1203: sensor; 1204: RAM; 1205: ROM; 1206: communication device; 1301: first OS; 1302: overall application manager; 1303: service manager; 1304: VM; 1305: second OS; 1306: application manager; 1307: application

The invention claimed is:

1. An application management apparatus configured to be mounted on a vehicle in which a plurality of information processing apparatuses are mounted at different locations corresponding to different vehicle passengers, each of the information processing apparatuses being selectively usable by a plurality of predetermined users, and to manage a storage region in which a plurality of application programs are stored, the application management apparatus comprising:

processing circuitry to:
in response to any one of the plurality of information processing apparatuses starting a startup process, thus becoming a start-up information processing apparatus, receive, from the start-up information processing apparatus, information identifying a user from among the plurality of predetermined users who is using the start-up information processing apparatus, acquire a use application program from the storage region, the use application program being an application program selected by the processing circuitry from among the plurality of applications programs based on the identified user of the start-up information processing apparatus; and transmit the use application program acquired to the start-up information processing apparatus.

2. The application management apparatus according to claim 1, wherein
in the storage region, a plurality of pieces of data to be used by the plurality of application programs are stored,
the processing circuitry acquires use data, which is data to be used by the use application program transmitted to the start-up information processing apparatus, from the storage region, and
the processing circuitry transmits the use data acquired to the start-up information processing apparatus.

3. The application management apparatus according to claim 1, wherein
the processing circuitry acquires a last-use application program, which is one of the plurality of application programs last used by the identified user of the start-up information processing apparatus, from the storage region, and
the processing circuitry transmits the last-use application program acquired to the start-up information processing apparatus.

4. The application management apparatus according to claim 3, further comprising an application table that stores, for each of the plurality of predetermined users, the one of the plurality of application programs last used by the user, and any other of the plurality of application programs associated with the user, wherein
the processing circuitry looks up the application table based on the identified user, and preferentially transmits the last-use application program to the start-up information processing apparatus if more than one of the plurality of application programs are determined to be associated with the identified user as a result of the look-up.

5. The application management apparatus according to claim 1, wherein
the processing circuitry, if a user change is detected in any one of the information processing apparatuses, receives additional application notification information notifying of, as an additional application program, an application program which is not held by the information processing apparatus out of one or more of the plurality of application programs determined to be used by a detected new user, and
the processing circuitry transmits the additional application program, notified of by the additional application notification information, to the information processing apparatus that is a transmission source of the additional application notification information.

6. The application management apparatus according to claim 1, wherein
the application management apparatus is any one of the plurality of information processing apparatuses.

7. An in-vehicle system comprising an application management apparatus mounted on a vehicle, and a plurality of information processing apparatuses mounted on a vehicle at different locations corresponding to different vehicle passengers, each of the information processing apparatuses being selectively usable by a plurality of predetermined users, the application management apparatus managing a storage region in which a plurality of application programs are stored, wherein
in response to each of the plurality of information processing apparatuses starting a startup process, thus becoming a start-up information processing apparatus, the application management apparatus
receives, from the start-up information processing apparatus, information identifying a user from among the plurality of predetermined users who is using the start-up information processing apparatus,
acquires a use application program from the storage region, the use application program being an application program selected by the application management apparatus from among the plurality of applications programs based on the identified user of the start-up information processing apparatus, and
transmits the acquired use application program to the start-up information processing apparatus, and
upon starting the startup process, each of the information processing apparatuses receives the corresponding use application program, which is transmitted from the application management apparatus, and starts the received use application program and completes the startup process.

8. The in-vehicle system according to claim 7, wherein
if a user change is detected in any of the information processing apparatuses, the corresponding information processing apparatus identifies, as an additional application program, an application program which is not held by the information processing apparatus out of one or more of the plurality of application programs determined to be used by a detected new user and transmits additional application notification information notifying of the identified additional application program to the application management apparatus,
the application management apparatus receives the additional application notification information and transmits the additional application program notified of by the additional application notification information, to the corresponding information processing apparatus that is a transmission source of the additional application notification information, and
the corresponding information processing apparatus receives the additional application program transmitted from the application management apparatus after transmitting the additional application notification information to the application management apparatus and starts the application program to be used by the new user including the received additional application program.

9. The in-vehicle system according to claim 8, wherein
the corresponding information processing apparatus receives the additional application program transmitted from the application management apparatus after transmitting the additional application notification information to the application management apparatus, executes the application program to be used by the new user including the received additional application program, and deletes an application program other than the application program to be used by the new user which is held by the corresponding information processing apparatus.

10. The in-vehicle system according to claim 8, wherein
if the user change is detected, the corresponding information processing apparatus deletes an application program other than the application program to be used by the new user which is held by the information processing apparatus, acquires the additional application program, and transmits the additional application notification information to the application management apparatus.

11. An application management method performed by a computer which is mounted on a vehicle in which a plurality of information processing apparatuses are mounted at different locations corresponding to different vehicle passengers, each of the information processing apparatuses being selectively usable by a plurality of predetermined users, and manages a storage region in which a plurality of application programs are stored, the application management method comprising:
in response to any one of the plurality of information processing apparatuses starting a startup process, thus becoming a start-up information processing apparatus,
receiving, from the start-up information processing apparatus, information identifying a user from among the plurality of predetermined users who is using the start-up information processing apparatus,
acquiring, by the computer, a use application program from the storage region, the use application program being an application program selected by the computer from among the plurality of application programs based on the identified user of the start-up information processing apparatus; and
transmitting, by the computer, the acquired use application program to the start-up information processing apparatus.

* * * * *